United States Patent

Hsu

[11] Patent Number: 6,104,268

[45] Date of Patent: Aug. 15, 2000

[54] MAGNETISM-SENSITIVE LIFTER ROTATABLE INTERMITTENTLY AND DIVIDING ANGLES CONTROLLED BY A COMPUTER

[75] Inventor: Chieh-Hsueh Hsu, Taipei Hsien, Taiwan

[73] Assignees: Chieh-Hsueh Hsu; Yi-Chien Lee, both of Taipei Hsien, Taiwan

[21] Appl. No.: 09/478,210

[22] Filed: Jan. 5, 2000

[51] Int. Cl.[7] .................................................... H01F 7/08
[52] U.S. Cl. .................... 335/220; 335/285; 335/287; 269/8
[58] Field of Search .................................. 335/220, 227, 335/228, 229, 230, 231, 285, 286, 287; 269/8; 83/468

[56] References Cited

U.S. PATENT DOCUMENTS

| | | | |
|---|---|---|---|
| Re. 29,081 | 12/1976 | Grundmann | 335/228 |
| 3,624,574 | 11/1971 | Mentagu | 335/279 |
| 4,903,578 | 2/1990 | Terp | 335/229 |

*Primary Examiner*—Lincoln Donovan
*Assistant Examiner*—Tuyēn Nguyēn
*Attorney, Agent, or Firm*—Rosenberg, Klein & Lee

[57] ABSTRACT

A magnetism-sensitive lifter rotatable intermittently and dividing angles by a computer includes many permanent magnets and many induction silicon steel magnets to attract and repel one another, possible to rotate intermittently, divide angles equal and unequal and move up and down vertically by control of a computer.

6 Claims, 34 Drawing Sheets

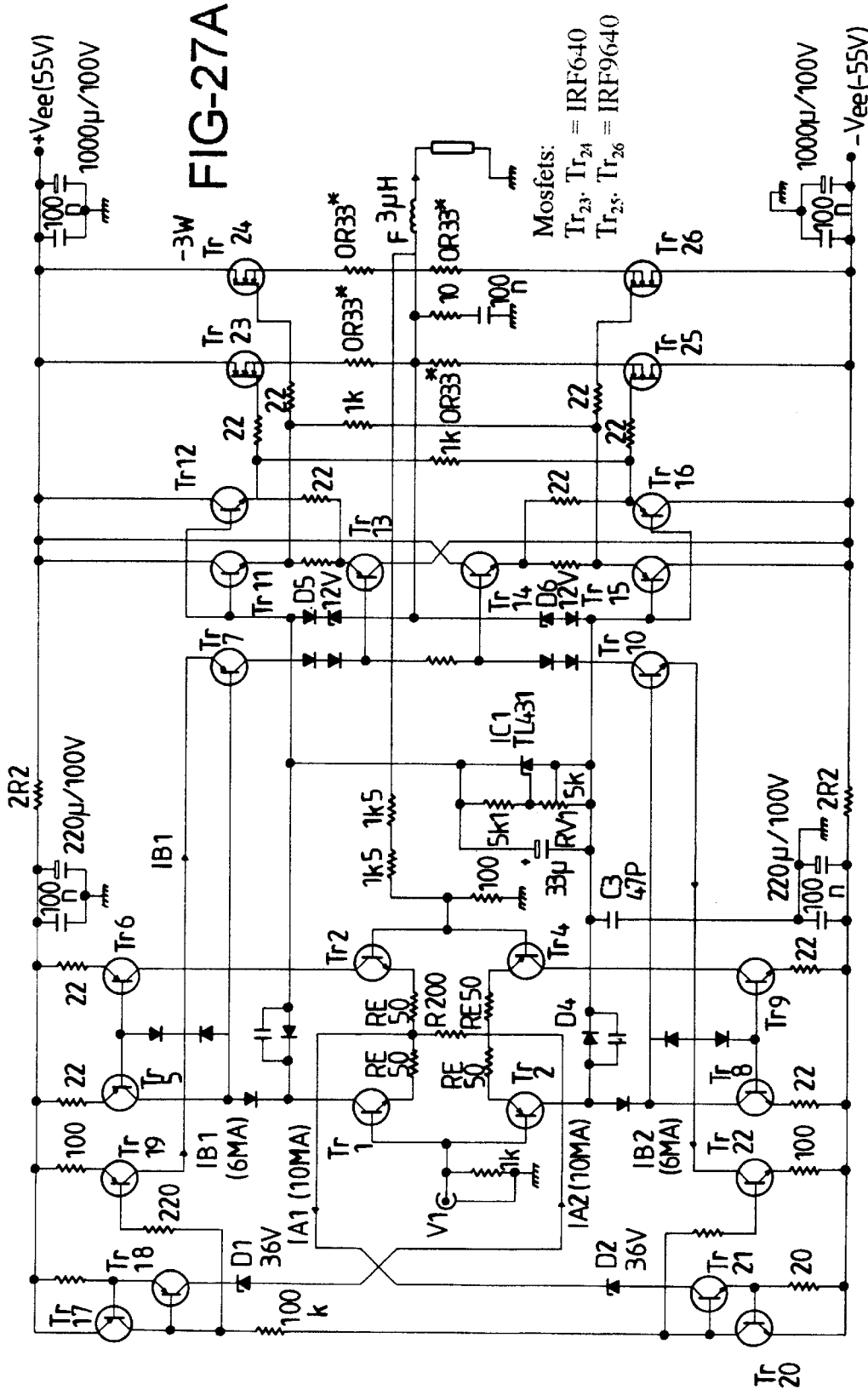

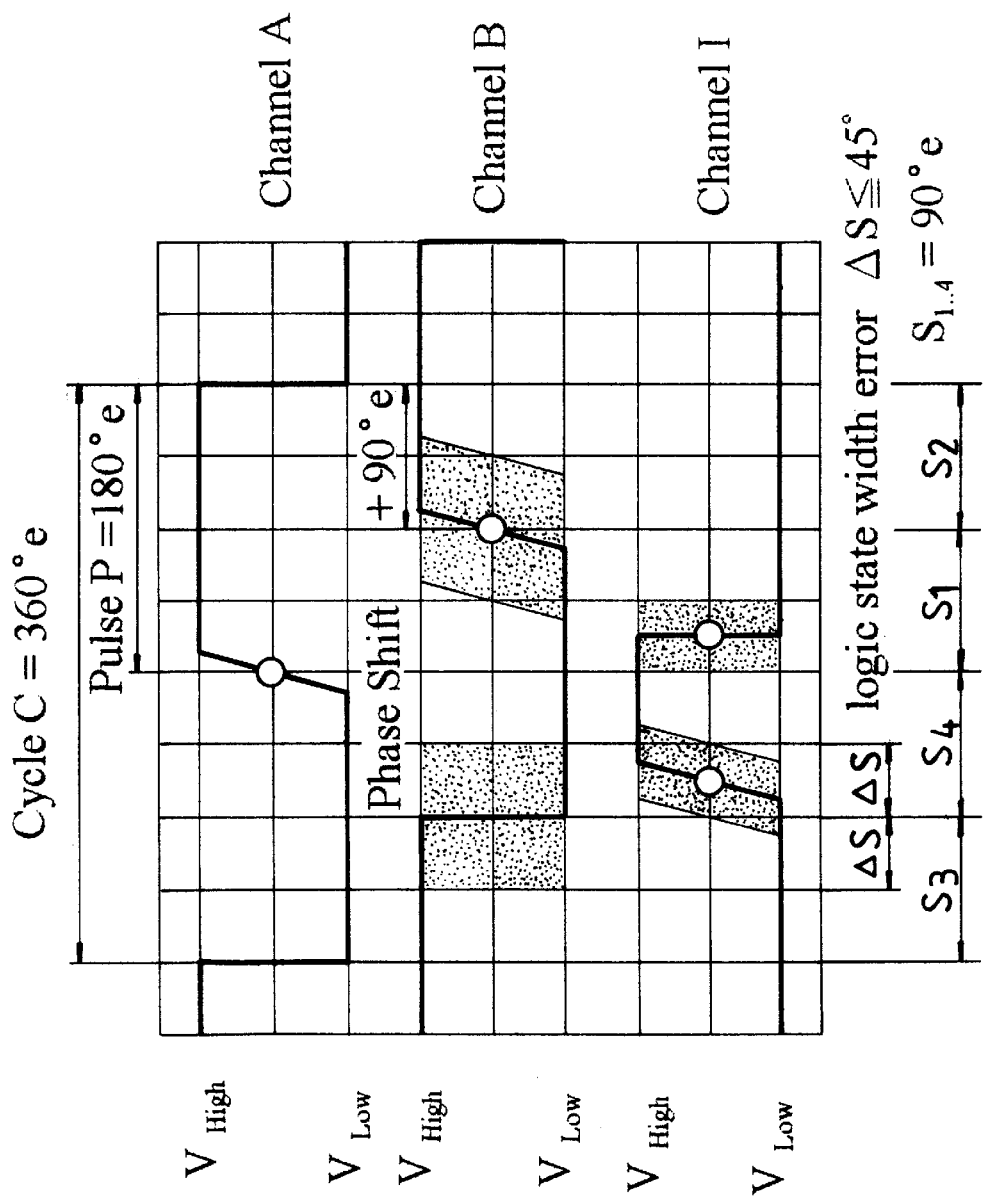

MAGNETISM-SENSITIVE LIFTER ROTATABLE INTERMITTENTLY AND DIVIDING ANGLES CONTROLLED BY A COMPUTER

BACKGROUND OF THE INVENTION

This invention relates to a magnetism-sensitive lifter rotatable intermittently and dividing angles controlled by a computer, particularly to one utilizing permanent magnets and induction silicon steel magnets to attract and repel one another, permitting the lifter rotate intermittently, divide angles equal or unequal and move and down coaxially in a housing controlled by computer containing preset programs. Then the lifter has a large clockwise and counterclockwise rotating torque, but no inertia, forming an ideal automated machine.

Automated machinery includes robots, an intermittent belt automatic production line, and a disc worktable.

Robot are operated by means of a serve motor, a driving circuit and controlled by a computer, very expensive, having a very complicated structure, mostly used for inserting electronic components, welding in car manufacturing, especially used by super large corporations.

The intermittent belt automotive production line is started and stopped by a cam divider rotated by a motor, also rotating for equal or unequal angles, only for performing work of separating a distance. Though it costs rather cheap, but a motor and driving means for it makes the cost higher, having a disadvantage of non-altering automation.

The cam disc worktable is rotated by a mechanical cam divider rotated by a motor and a driver for performing equal angle, equal distance and equal time division.

The disc worktable is fixed on the divider, for various workstations around the disc worktable to carry out automatic assembling. Though the cam disc worktable costs only a fraction of expenditure of the robot serve motor and the driver, its utilizing scope is limited. The inventor of the invention has more than two decades of manufacturing and developing experience, aware of the fact that making cam dividers involves complicated process, demanding precision, resulting in high cost, impossible to make alteration of automation for various kinds of operation.

SUMMARY OF THE INVENTION

In view of high costs of robot arms, serve motors, and computers for controlling, a complicated manufacturing method of mechanical cam intermittent dividers which can only make a single angle division, impossible to automate, This invention has been devised. The magnetism-sensitive lifter rotatable intermittently and dividing angles controlled by a computer in the present invention has the feature that permanent magnets and induction silicon steel magnets are provided to attract and repel one another, permitting the lifter rotate intermittently, divide angles equal or unequal and move up and down coaxially in a housing controlled by a computer containing preset programs. Then a round worktable is fixed on the magnetism-sensitive lifter for using this lifter for the above-mentioned operation.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
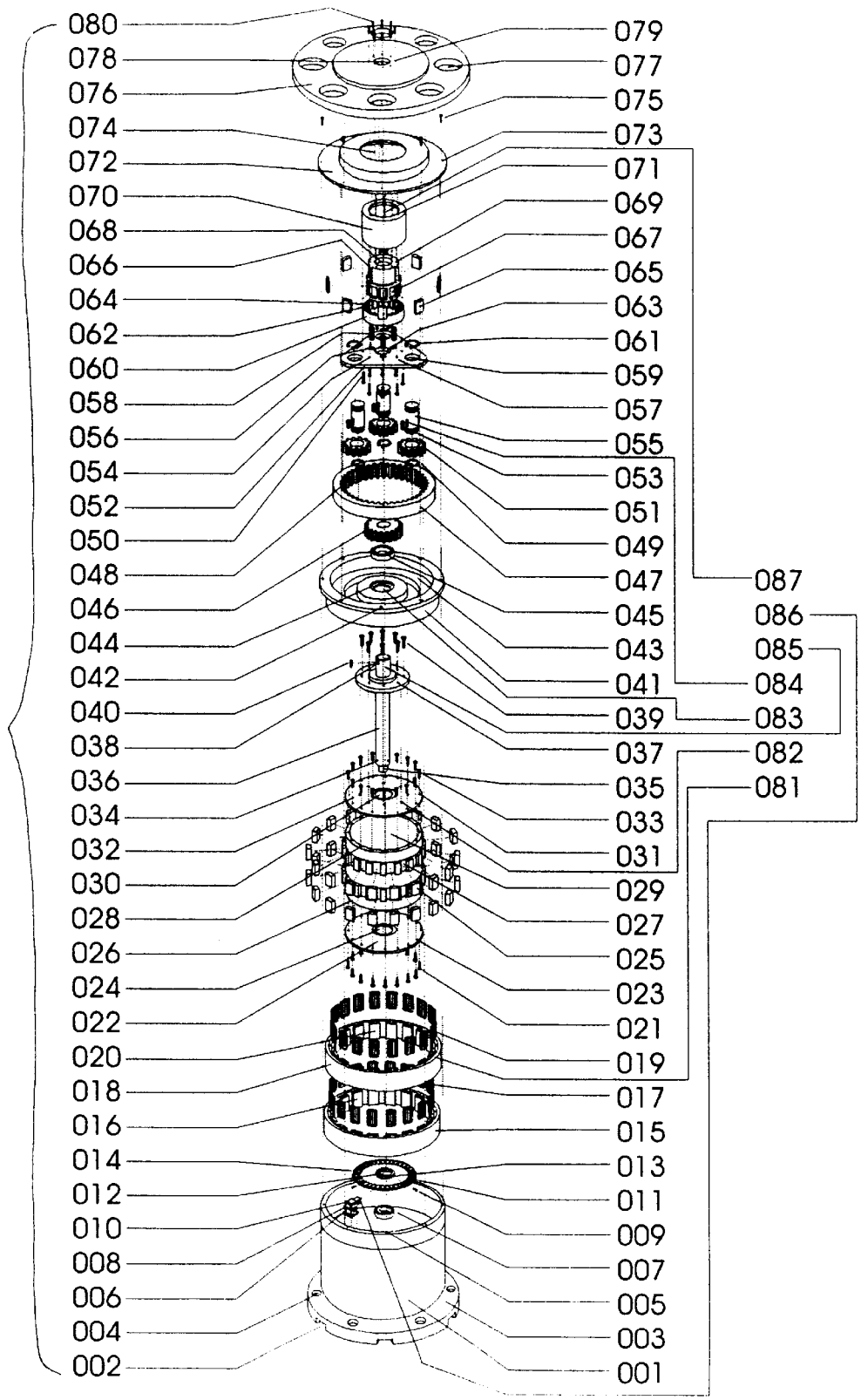
FIG. 1 is an exploded perspective view of a lifter magnet-sensitive and rotating intermittently for different angles by a computer of the present invention.

A preferred embodiment of a magnetism-sensitive lifter rotatable intermittently for different angles controlled by a computer of the present invention, as shown in FIG. 1, includes an housing 001, and one or more induction silicon steel magnet rings 015 fixed in the housing 001, and an induction coil 017 fixed around each induction silicon steel pole.

Figure 5:
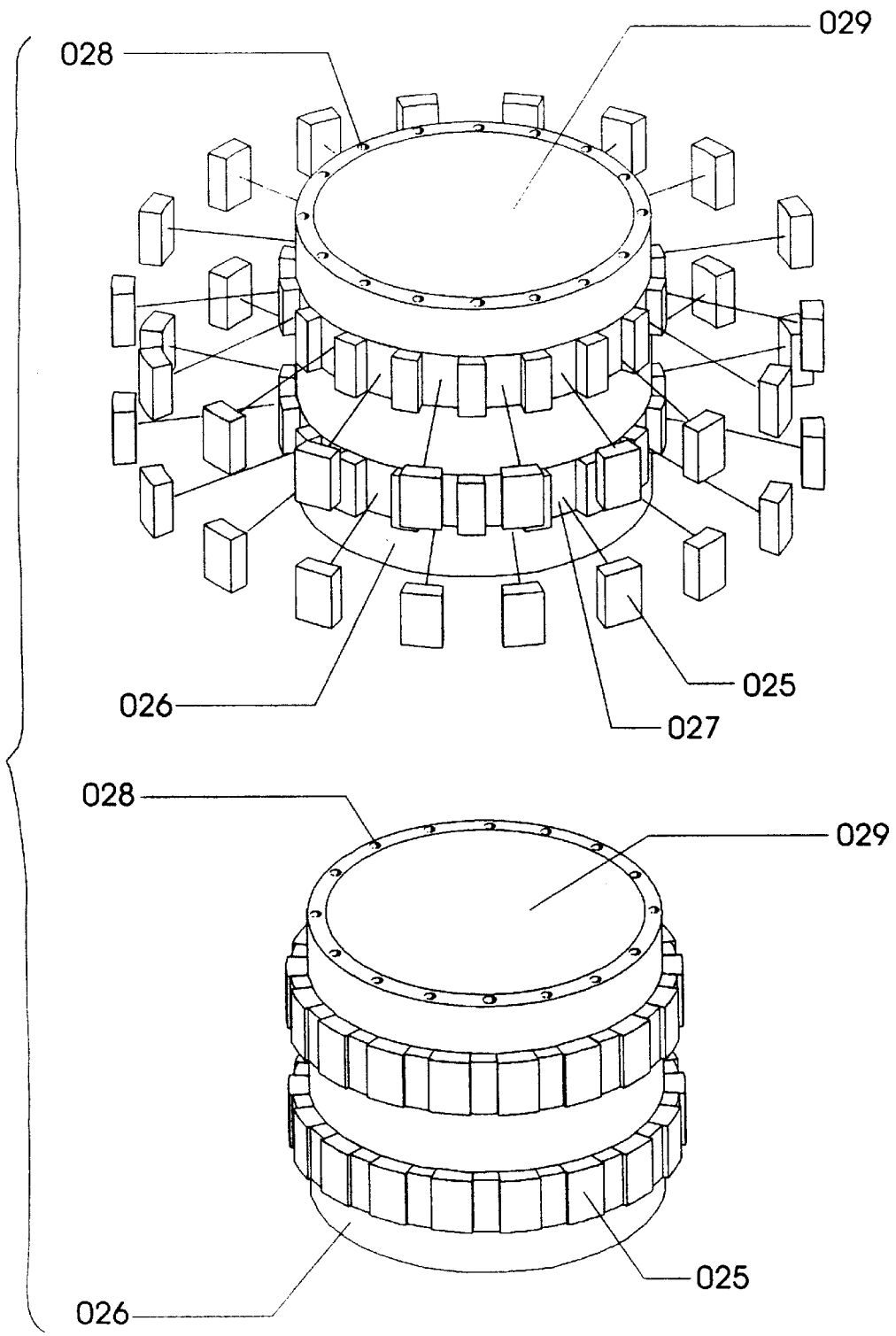
FIG. 5 is an exploded and combined perspective view of permanent magnets and a dividing rotatable wheel of the present invention.

Further, the lifter includes a dividing rotatable wheel 026 fixed in the induction silicon steel magnet ring 015 coaxially and the same number of permanent magnets 025 as the induction silicon steel poles fixed in an outer surface of the dividing rotatable wheel 026, as shown in FIG. 5.

Figure 6:
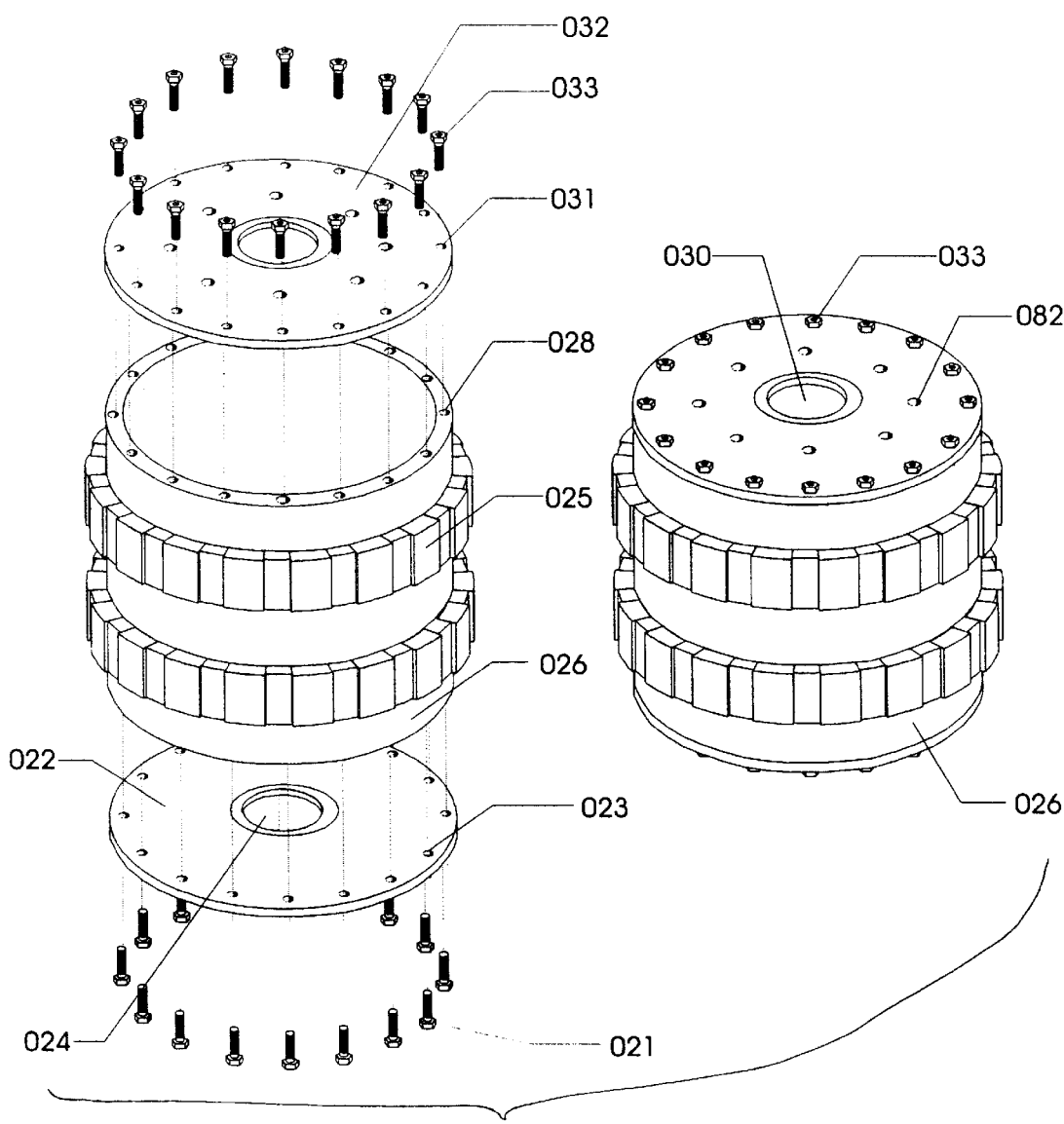
FIG. 6 is an exploded perspective view of the dividing rotatable wheel of the present invention.

Further, the lifter includes an upper seal cap 032 and a lower seal cap 022 are respectively fixed on and under the dividing rotatable wheel 026, as shown in FIG. 6, and a hollow main shaft 036 is provided to pass through the upper seal cap 032, the dividing wheel 026 and the lower seal cap 022. A bearing 007 is fixed around a lower portion of the main shaft 036 to rotate.

Figure 7:
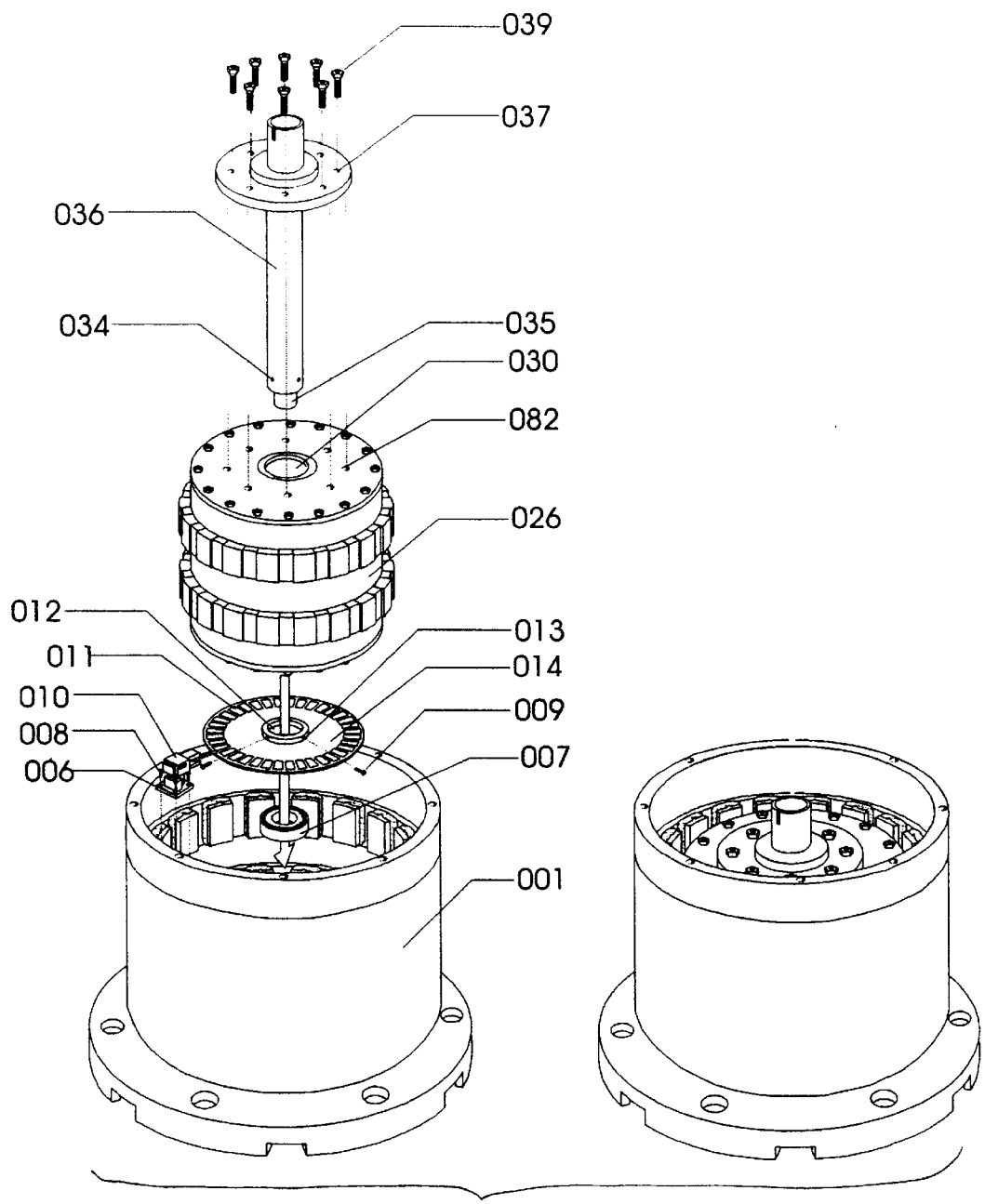
FIG. 7 is an exploded and combined perspective view of the divider body, a main shaft, the dividing rotating wheel, and an angle dividing analysis sense disc of the present invention.

Further, as shown in FIG. 7, the lifter includes an sense disc 014 for angle dividing analysis fixed on a lower portion of the main shaft 036, and a sensor 010 fixed near an inner upper surface of the housing 1 for sensing rotating and leaving magnets for dividing an angle.

Further, as shown in FIGS. 8, 9, 10 and 13, the lifter includes a bearing 045 fitted around an upper end section of the main shaft 036, a planet gear base 41 placed on an upper end of the housing, a planet outer annular gear 047 fixed on the planet gear base 41, a sun gear 046, three planet gears 051 engaging with the sun gear 051 and the planet outer annular gear 047, and a gear plate 052 located on the three planet gears 051 and a lifter body 070 to rotate for various angles.

Further, as shown in FIGS. 15, 16, 17, 18, and 19, the filter includes an annular multi-pole induction silicon steel magnet 60 fixed in an upper inner surface of the lifter body 070, and a center hollow cylinder 086 fitted in the annular multi-pole induction silicon steel magnet 060, and a plurality of permanent magnets 065 placed spaced apart around a lower outer surface of the center hollow cylinder 086 and movable up and down straight and intermittently by the computer 092.

Figure 22:
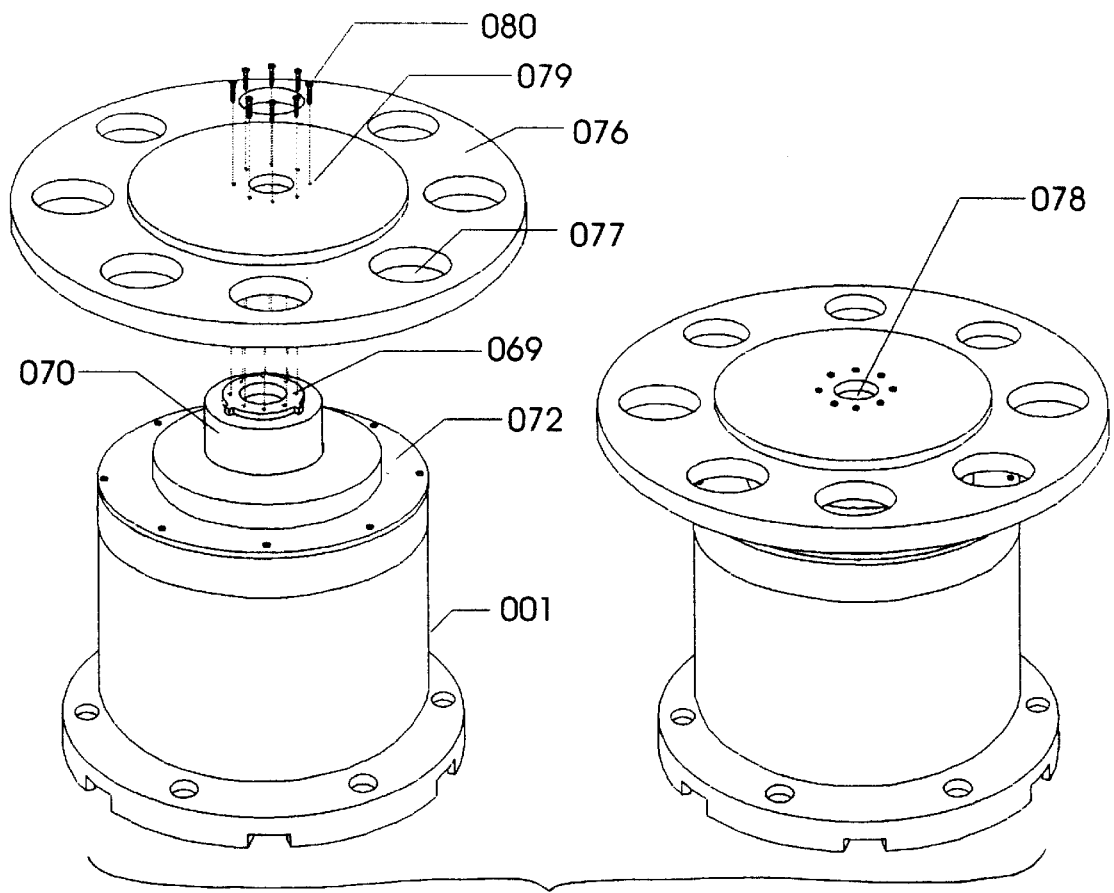
FIG. 22 is an exploded and combined perspective view of a round work table and the magnetism-sensitive lifter rotatable intermittently and dividing angles of the present invention.

Further, as shown in FIG. 22, the lifter includes a combining cap 072 around the lifter body 70 and combining the lifter body 70 with the housing 1 to form the magnetism-sensitive lifter rotating intermittently and dividing angles by a computer in this invention. In addition, a disc 076 is provided on the lifter, having a work surface, rotating for equal or unequal angle and intermittently moving up and down for a different height for various automotive machines to perform automatic production work and moving to all direction.

Figure 2:
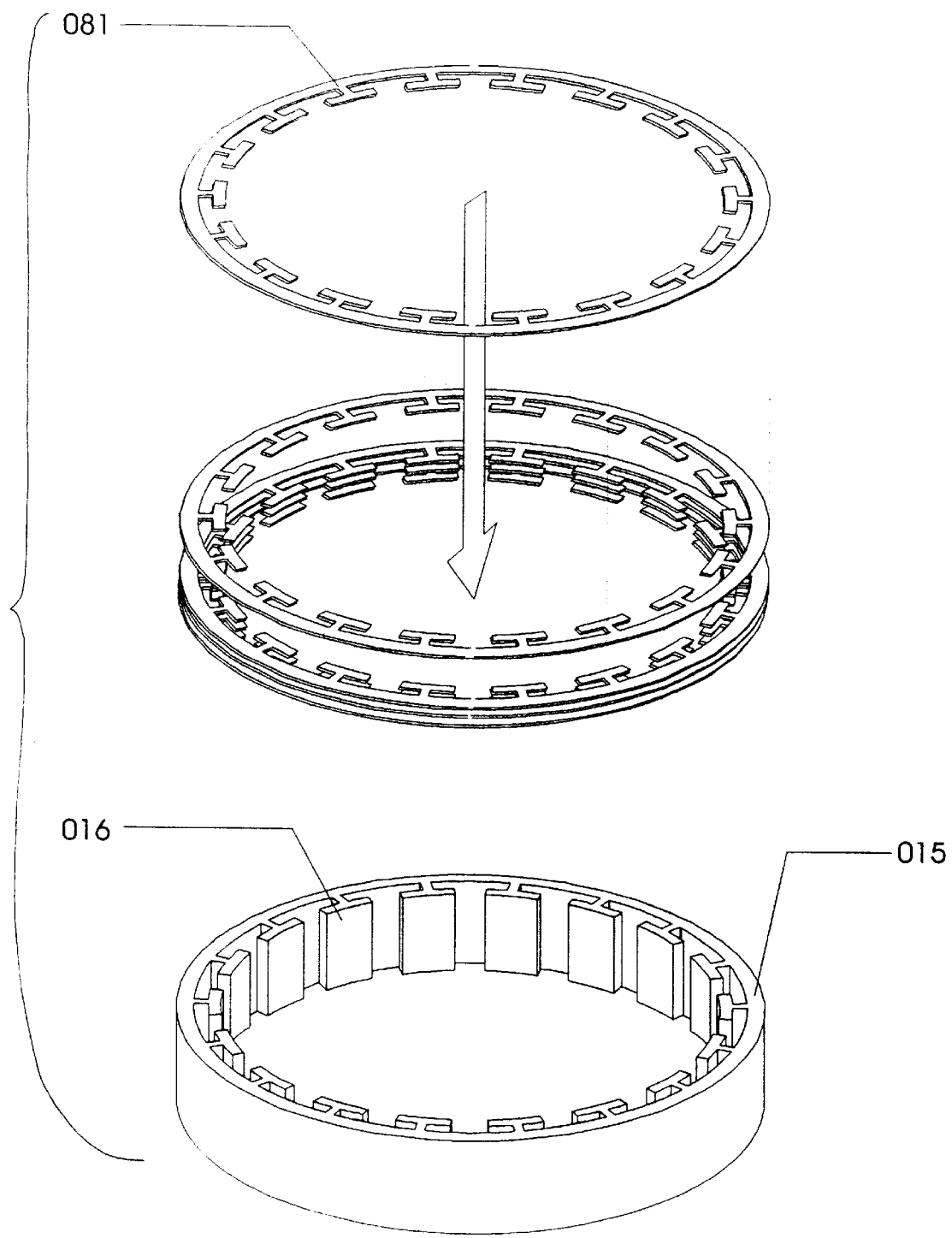
FIG. 2 is an exploded perspective view of an induction silicon steel magnet base ring having plural induction magnetic surfaces of the present invention.
Figure 3:
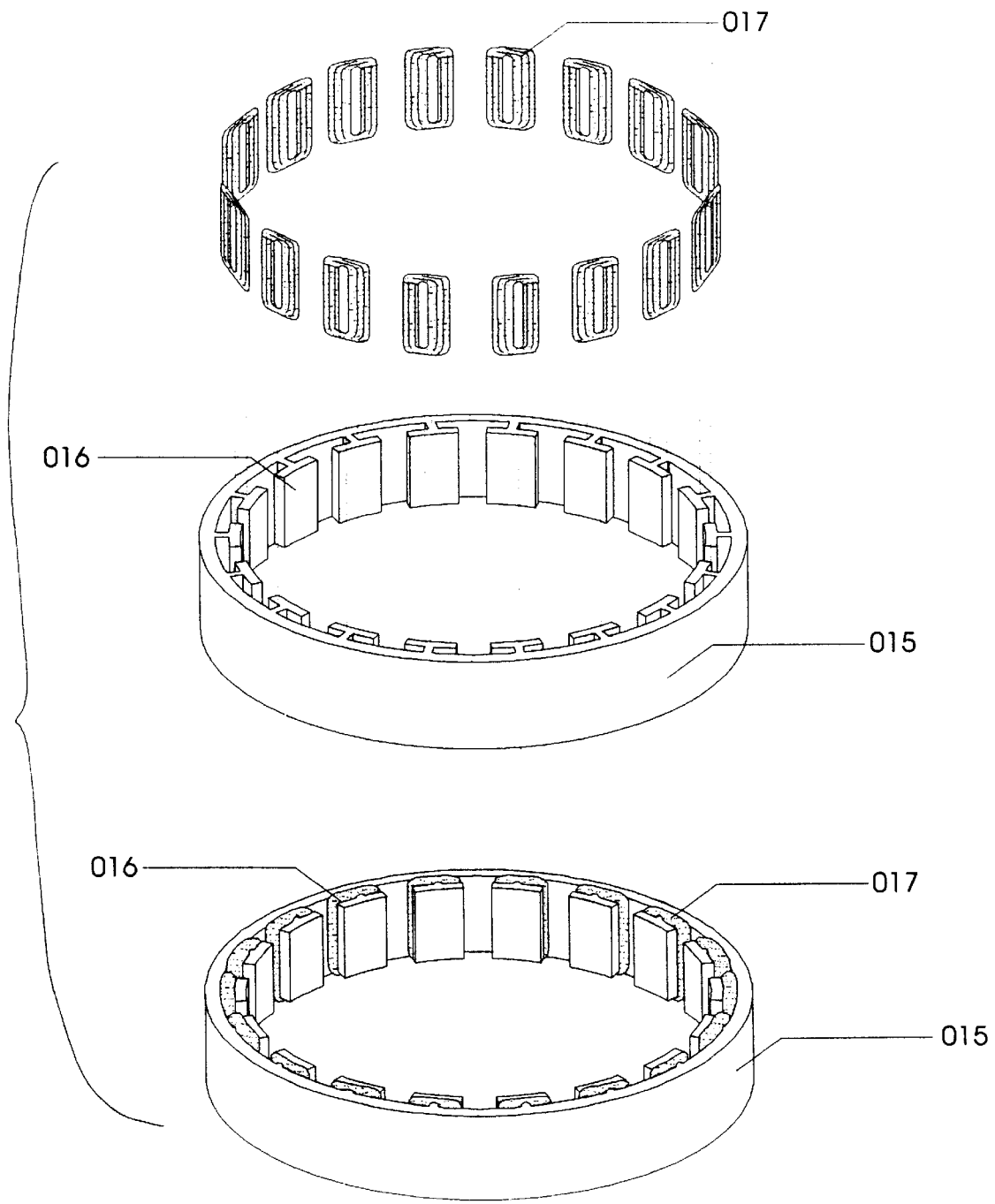
FIG. 3 is an exploded perspective view of induction coils and an annular induction silicon steel magnet base of the present invention.

Now more detailed description is to be explained below. As shown in FIG. 2, the annular multi-pole induction silicon steel magnet 015 is made of many layers of silicon steel plates 081 pressed one on the other, having a plurality of poles 016 formed spaced apart around on an inner annular surface, and each wound around with an induction coil 017, as shown in FIG. 3.

Figure 4:
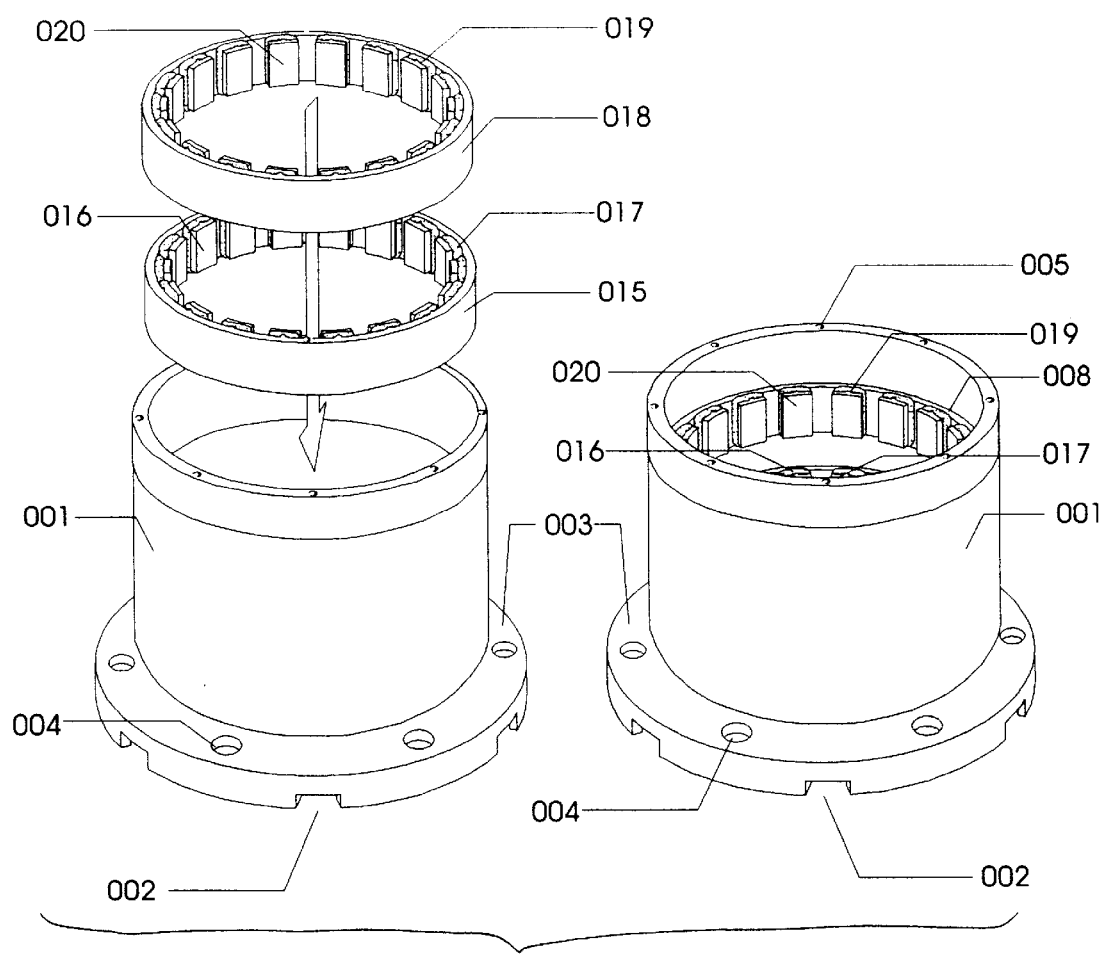
FIG. 4 is an exploded and combined perspective view of a lifter body and two annular induction silicon steel magnets base of the present invention.

Then the annular multi-pole induction silicon steel magnet 015 is tightly pressed in the housing 001, as shown in FIG. 4.

Next, as shown in FIG. 5, the dividing rotatable wheel 026 has a round hollow 029, a plurality of magnet fixing recesses 027 formed in an outer surface for respectively fitting a permanent magnet 025 therein and bolt holes 028 for bolts 033 to secure the upper seal cap 032 and the lower seal cap 022 with divide wheel 026 as shown in FIG. 6. Then as shown in FIG. 7, the main shaft 026 is inserted in a center hole 030 of the upper seal cap 032 and through down the dividing rotatable wheel 026, and holes of a support disc 037 are aligned to the bolt holes 082 of the upper cap 032 for bolts 039 to secure the carry disc 037 with the upper cap 032.

The hollow main shaft 036 has its lower end pass through the angle divide analysis sense disc 014 and secured with a fix ring 012 on the sense disc 014 with screws 009 engaging the holes 034 and holes 013 of the ring 012. The lower end of the main shaft 036 further goes down to pass through a lower bearing 007. Then the sensor 010 is secured on the bottom of the housing 001 with screws 008. An induction groove 93 is located in front of the sensor disc 010 aligned to the sense disc 014 to be fixed in the housing 001 as shown in the right side of FIG. 7.

Figure 8:
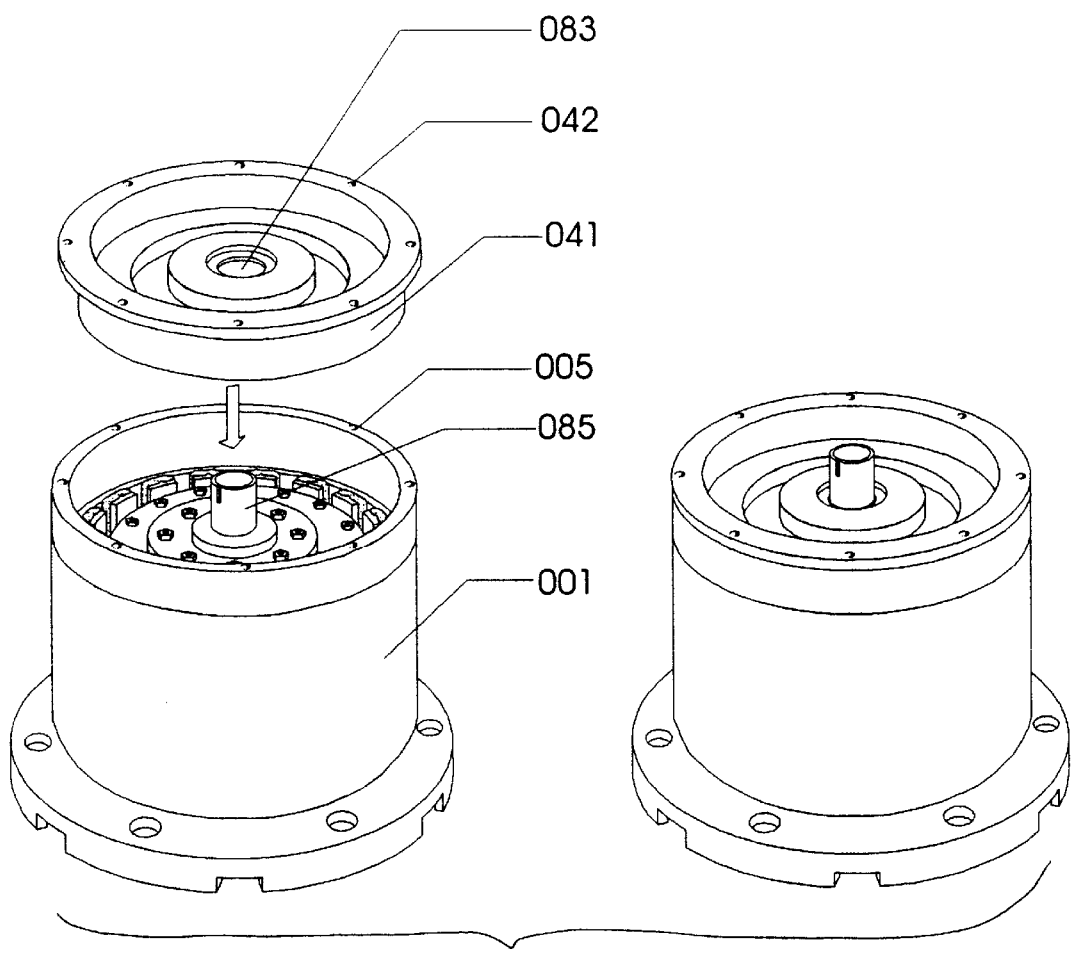
FIG. 8 is an exploded and combined perspective view of the dividing rotating wheel and a planet gear base of the present invention.
Figure 9:
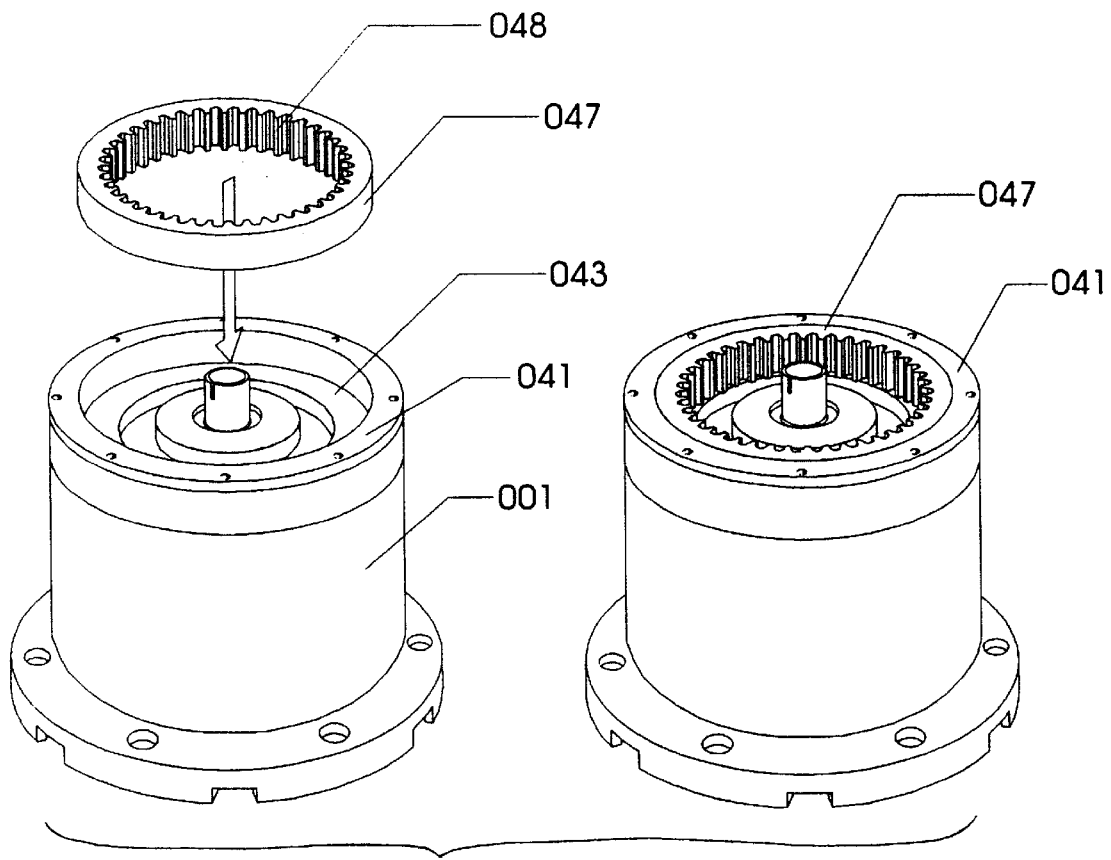
FIG. 9 is an exploded and combined perspective view of an outer annular gear fixed on the planet gear base of the present invention.
Figure 10:
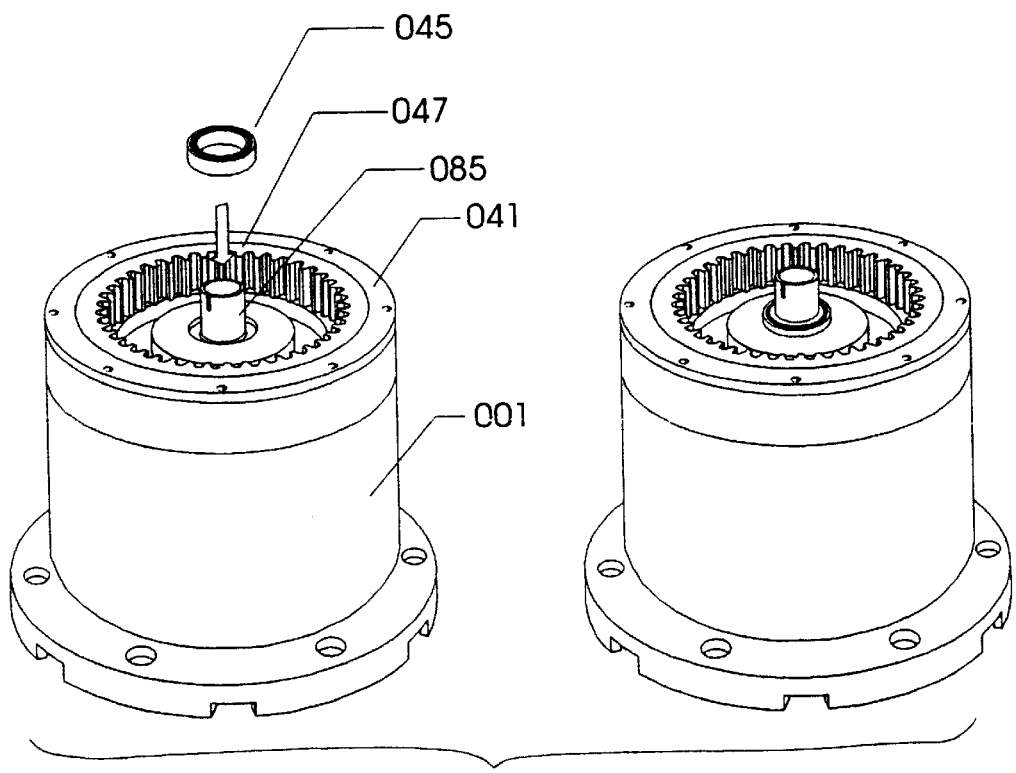
FIG. 10 is an exploded and combined perspective view of a shaft bearing, a hollow main shaft and the dividing rotatable wheel of the present invention.
Figure 11:
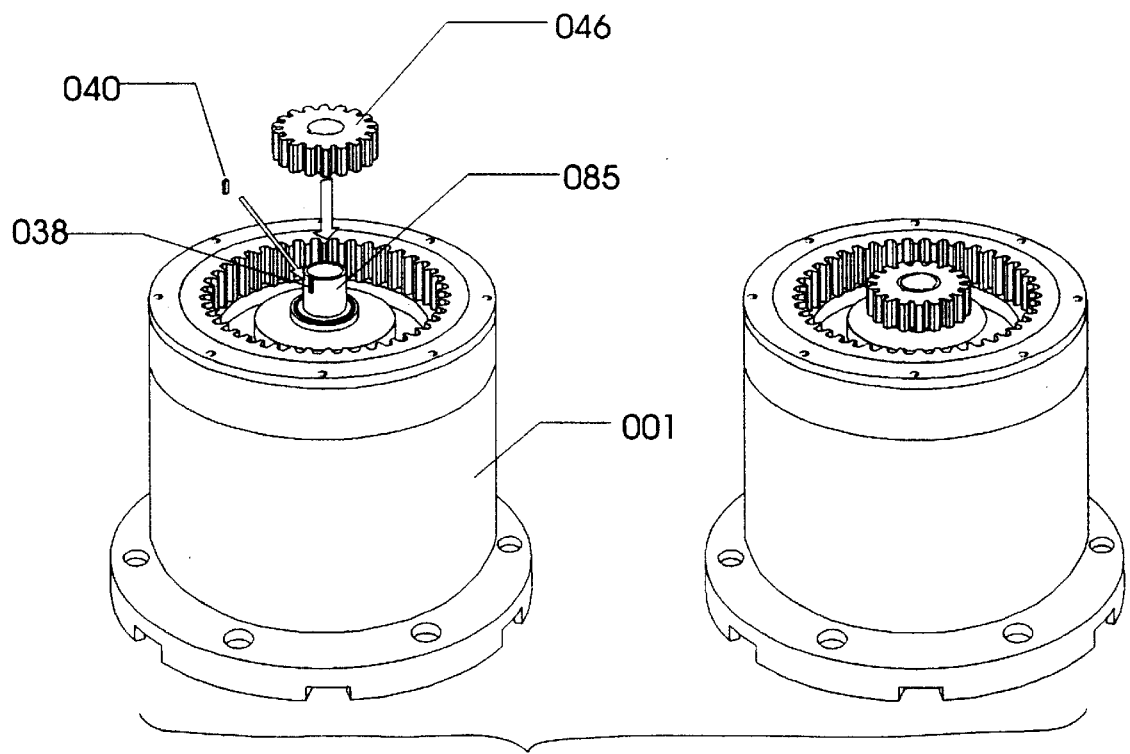
FIG. 11 is an exploded and combined perspective view of a sun gear, the main shaft of the dividing rotatable wheel and the housing of the present invention.
Figure 12:
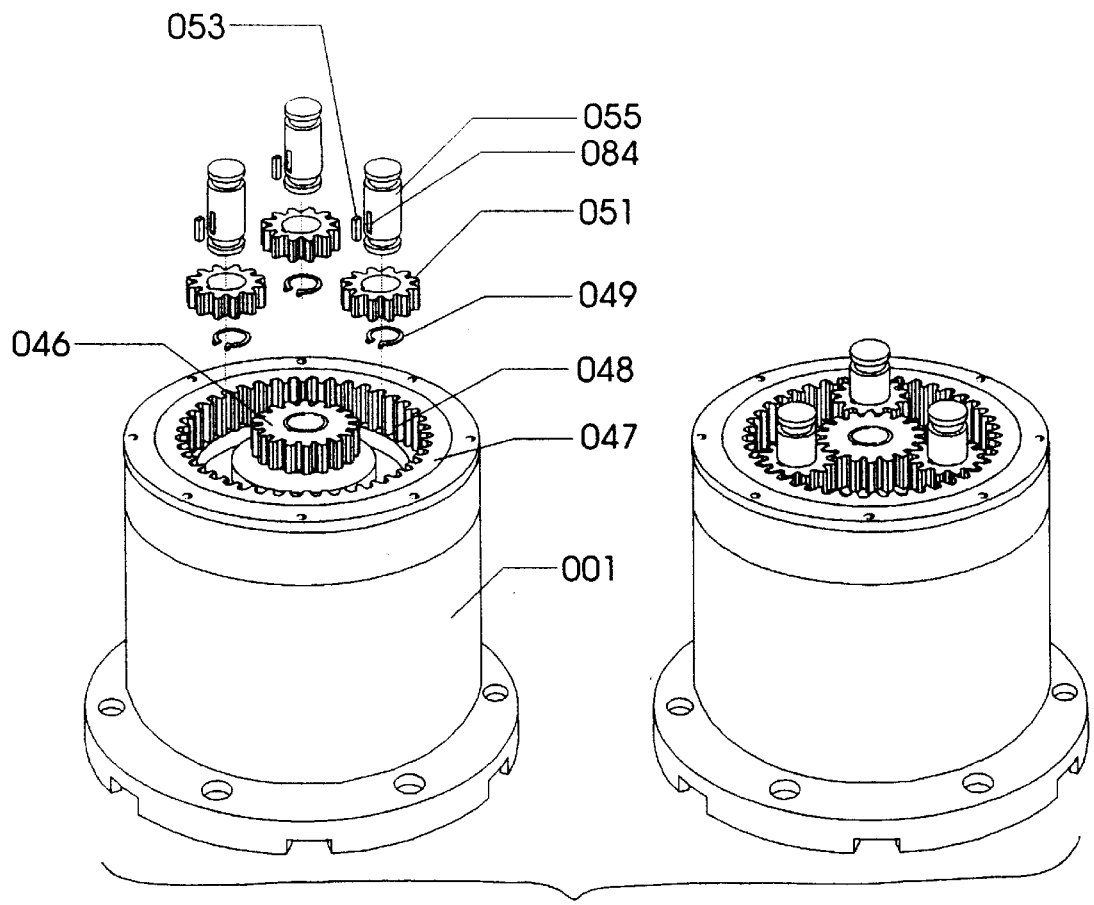
FIG. 12 is an exploded and combined perspective view of three planet gears, their shafts, the planet gear base, the dividing rotating wheel, and the housing in the present invention.

Next, as shown in FIG. 8, the planet gear unit base 041 is fitted on an upper end of the housing 001, and the outer annular gear 047 is placed on the planet gear unit base 041 as shown in FIG. 9, and a bearing 045 is fitted around an upper portion of the main shaft 036 as shown in FIG. 10. The sun gear 046 is fitted around the upper end of the main shaft 036 and secured with the same shaft 036 with a pin 040 as shown in FIG. 11. FIG. 12 shows that the three planet gears 051 each have a shaft 055 fitted in a center hole and secured in the planet gear unit base 041 with a spring lock washer 049.

Figure 13:
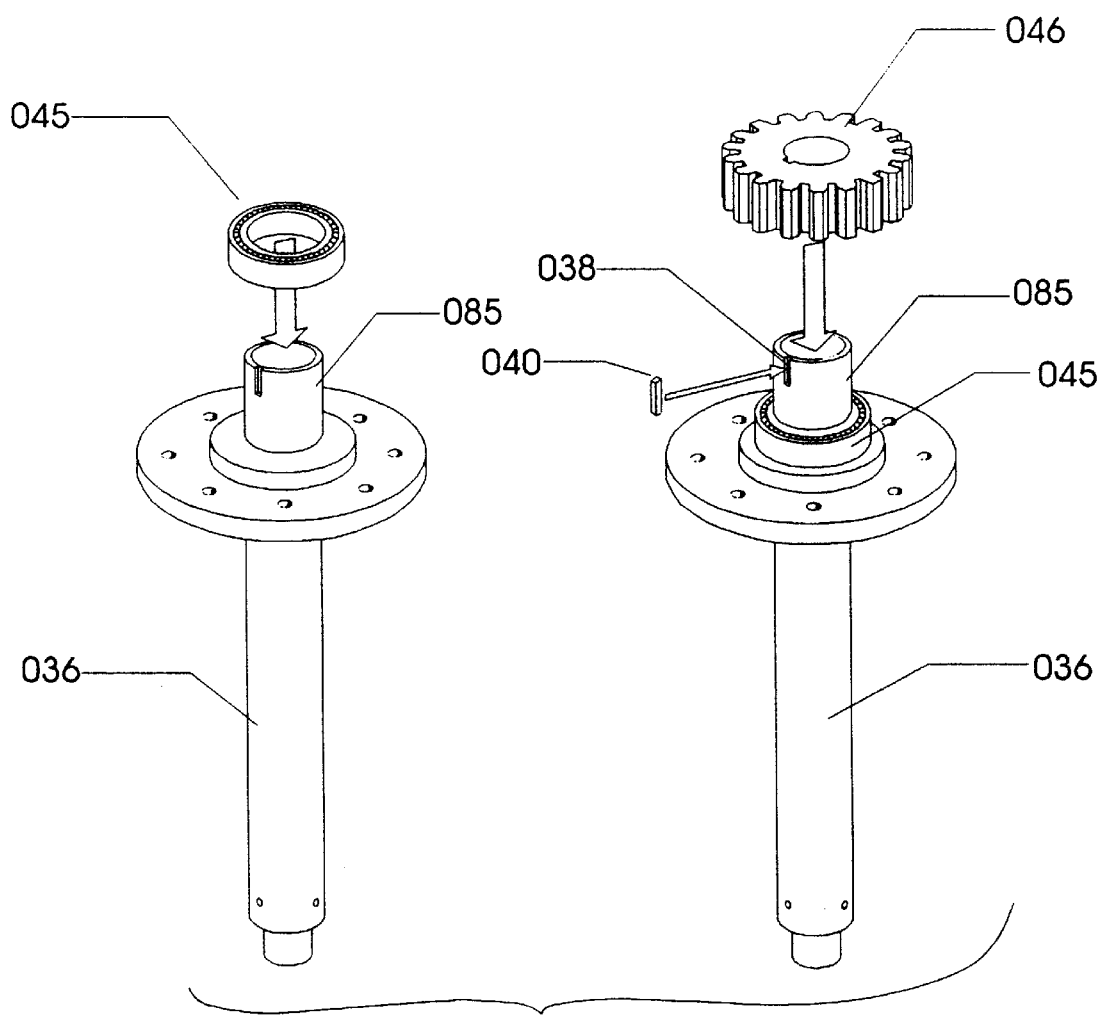
FIG. 13 is a perspective view of the sun gear and a bearing combined with the main shaft of the present invention.
Figure 14:
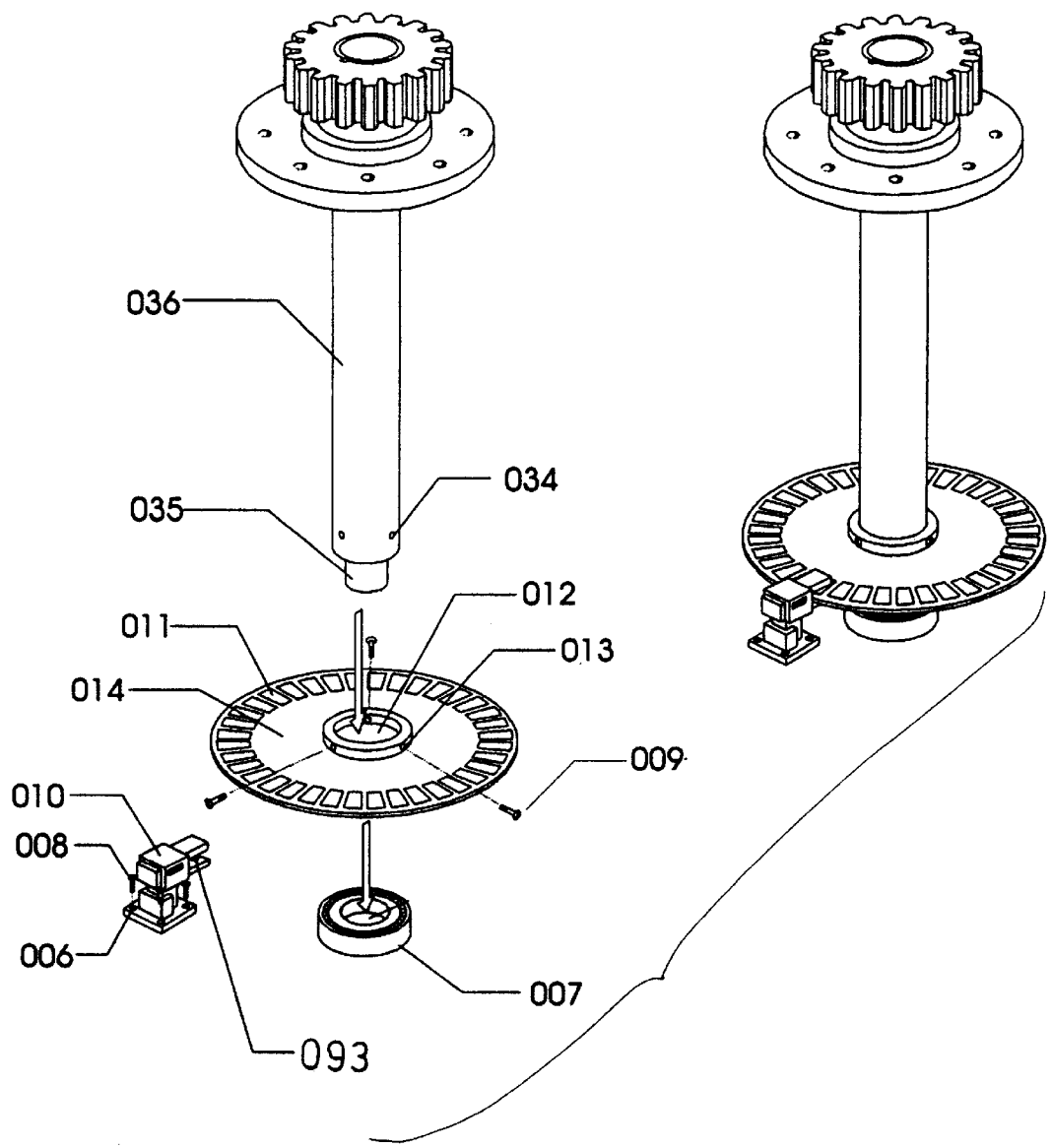
FIG. 14 is an exploded and combined perspective view of the main shaft with the sun gear, the dividing rotatable sense disc, the bearing and a sensor of the present invention.

Then rotating torque of the dividing rotatable wheel 026 is transmitted to the three planet gear unit 051. FIG. 13 shows the main shaft 036, the sun gear 046 and the lock pin 040, and FIG. 14 shows the sense disc 014 and the sensor 010.

Figure 15:
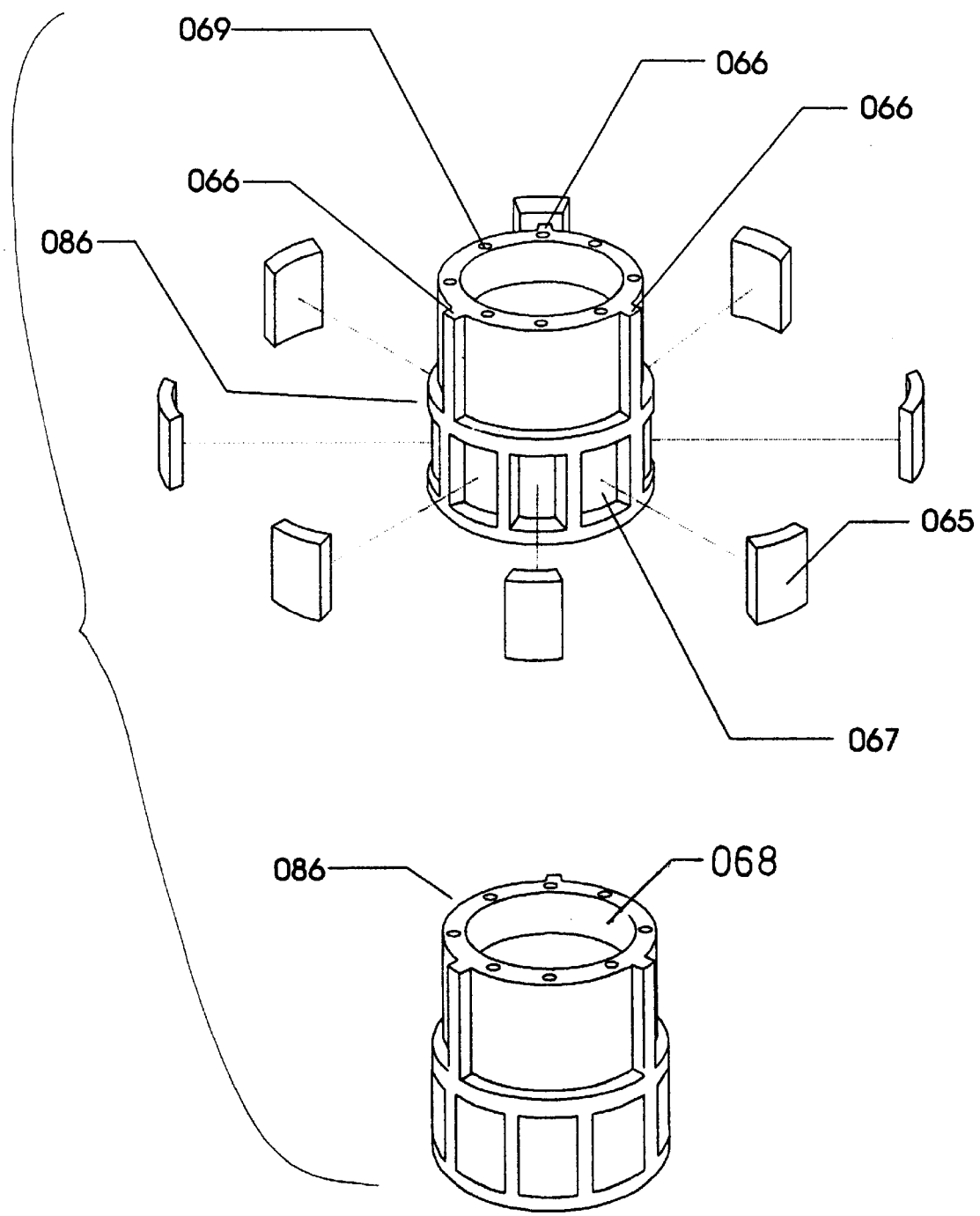
FIG. 15 is an exploded and combined perspective view of a center hollow cylinder and permanent magnets of the present invention.
Figure 16:
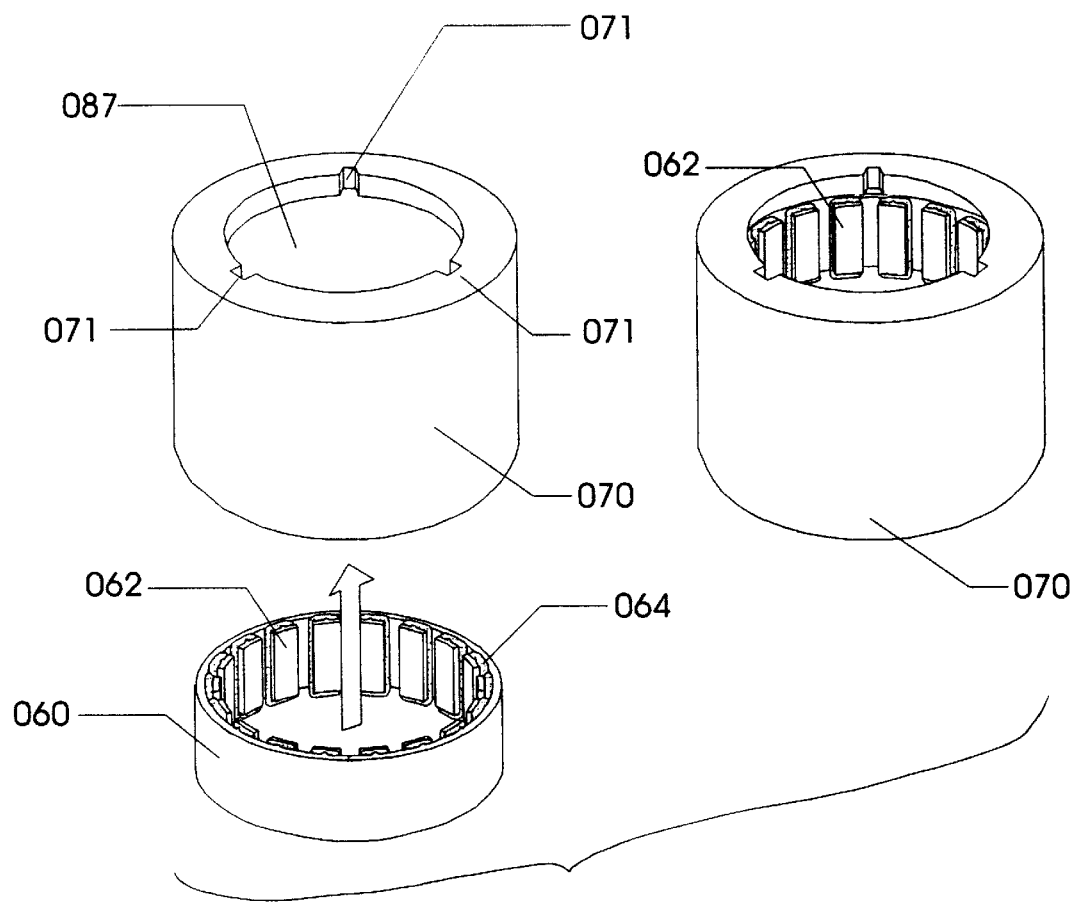
FIG. 16 is an exploded and combined perspective view of a magnetism-sensitive lifter body and an annular multi-pole induction silicon steel magnet of the present invention.
Figure 17:
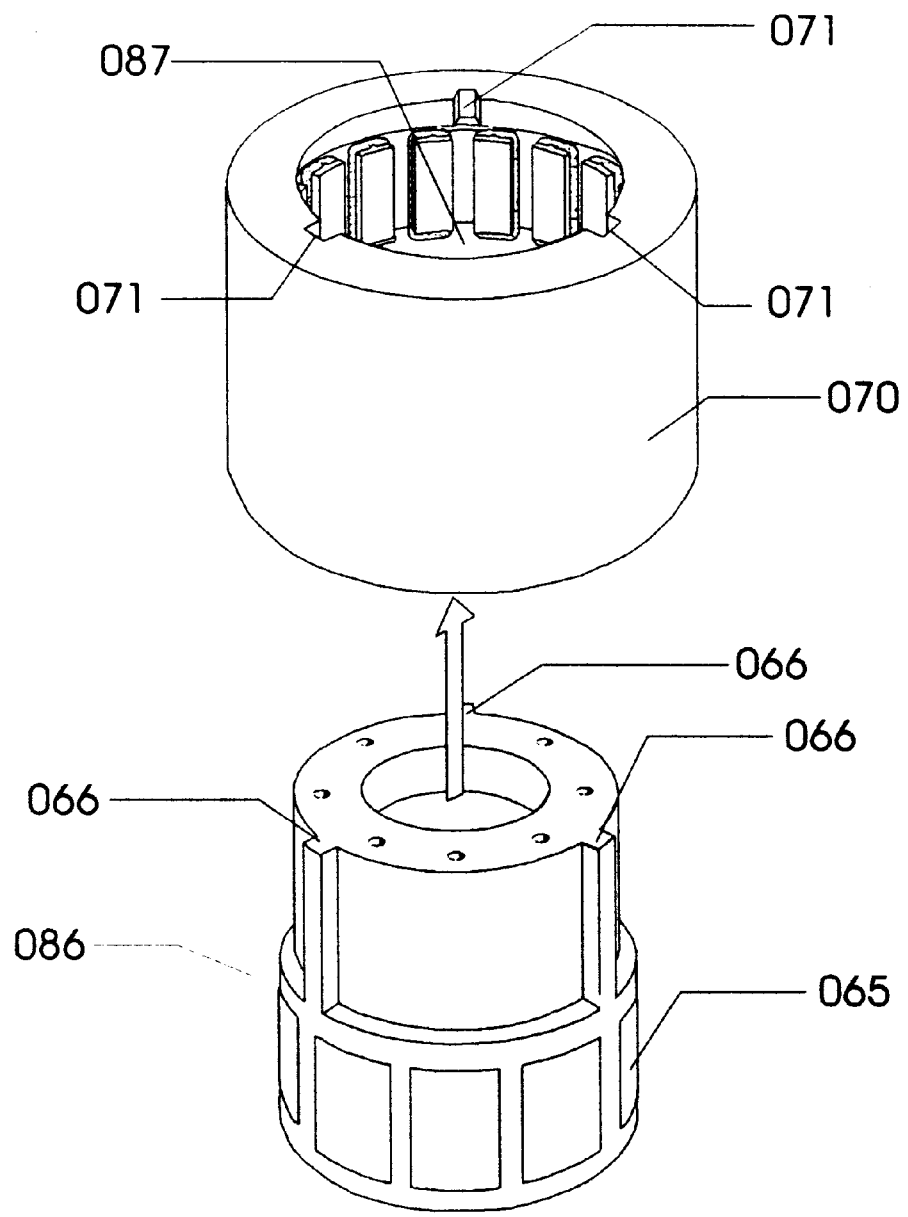
FIG. 17 is an exploded view of the magnetism-sensitive lifter body and the center hollow cylinder of the present invention.
Figure 18:
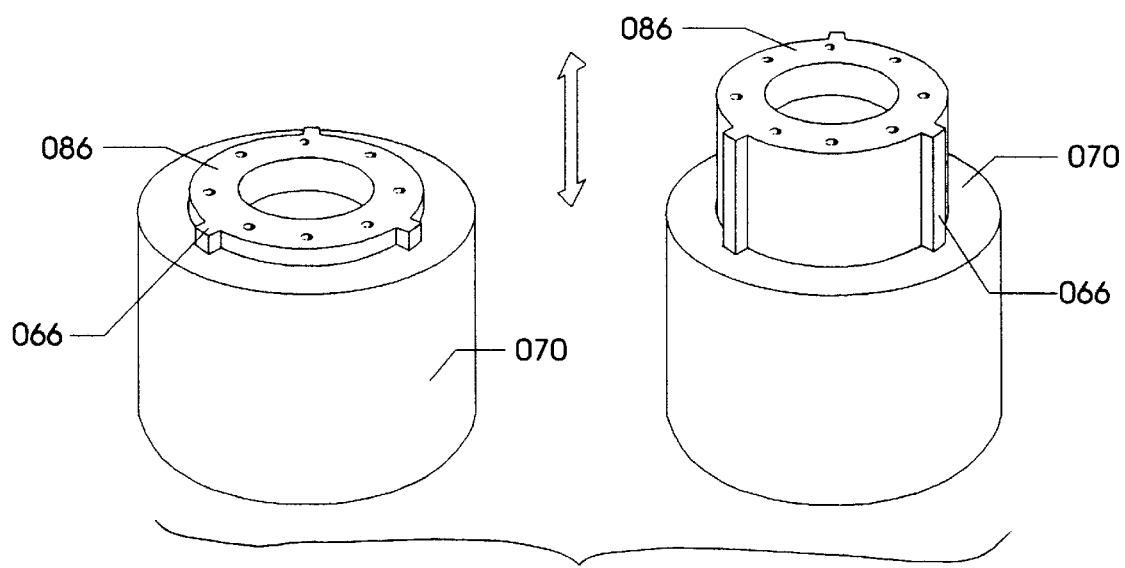
FIG. 18 is a perspective view of the center hollow cylinder combined with and moved up and down in the magnetism lifter body of the present invention.
Figure 19:
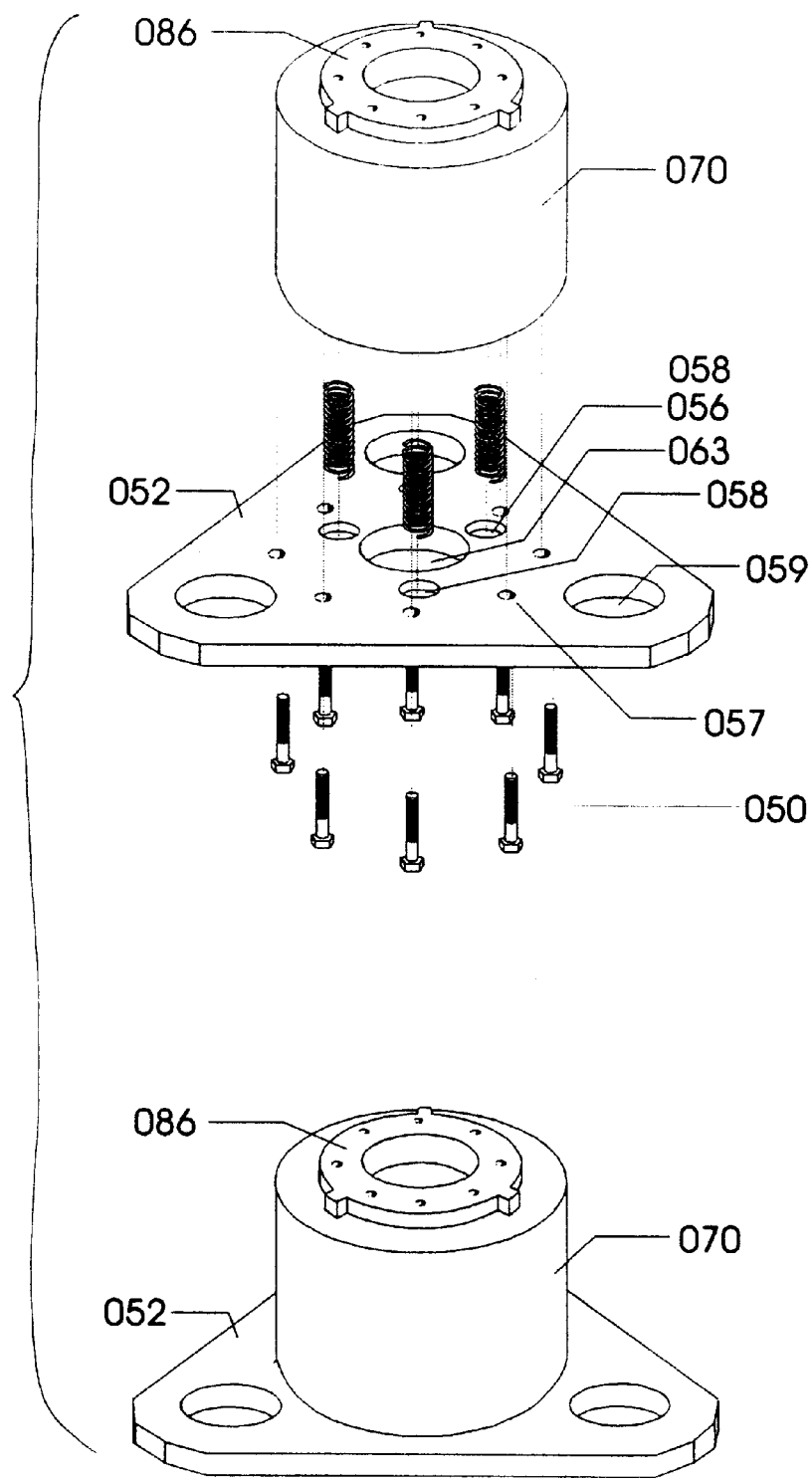
FIG. 19 is an exploded and combined perspective view of the magnetism-sensitive lifter body and a planet gear output plate of the present invention.
Figure 20:
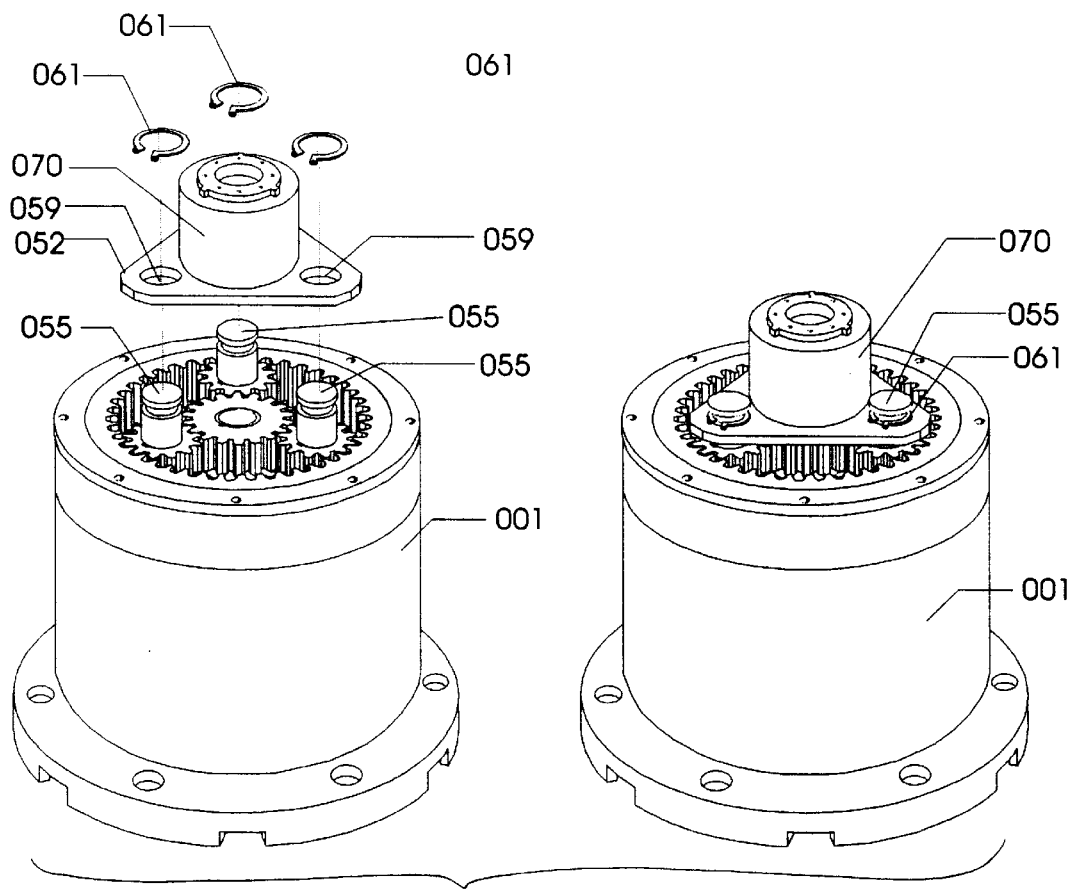
FIG. 20 is an exploded and combined perspective view of a housing, a magnetism-sensitive lifting structure and an angle dividing structure of the present invention.
Figure 21:
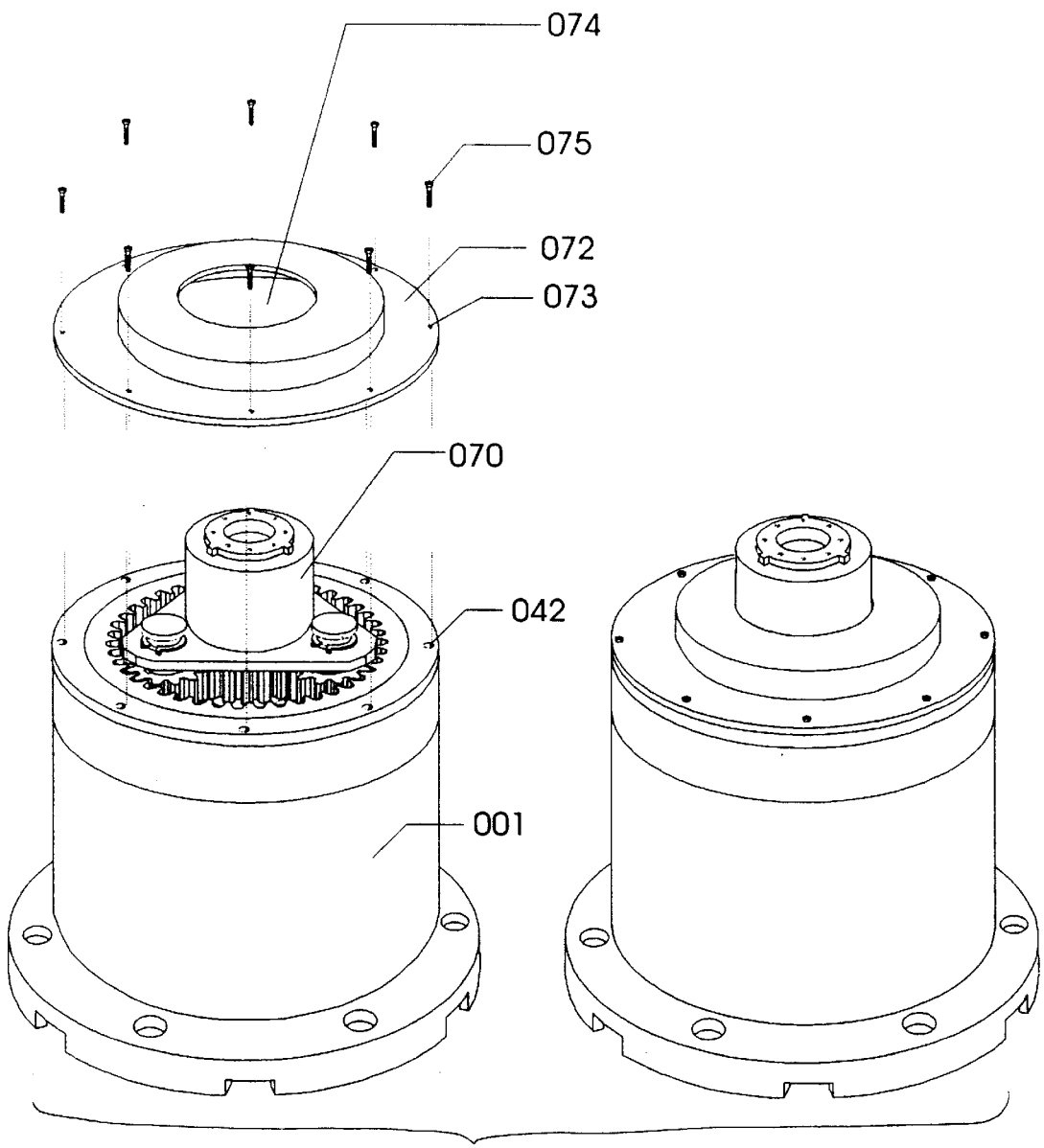
FIG. 21 is an exploded and combined perspective view of an upper cap and the magnetism sensitive lifter rotatable intermittently and dividing angles of the present invention.
Figure 23:
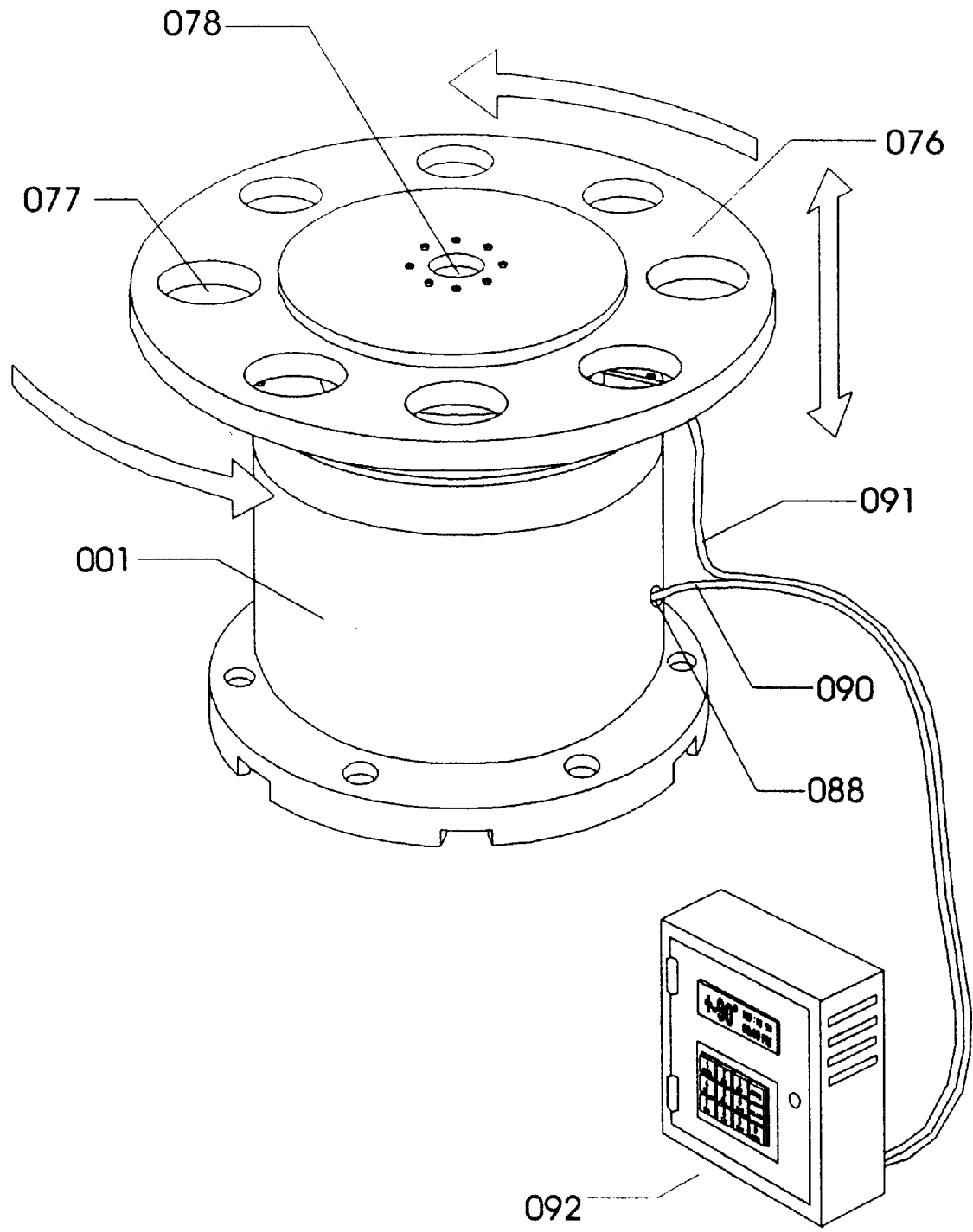
FIG. 23 is a perspective view of the finished magnetism-sensitive lifter rotatable intermittently and dividing angles combined with the worktable and connected with a computer of the present invention, showing the lifter able to be rotated intermittently and dividing angles equal and unequal and moved up and down by means of the computer.
Figure 24:
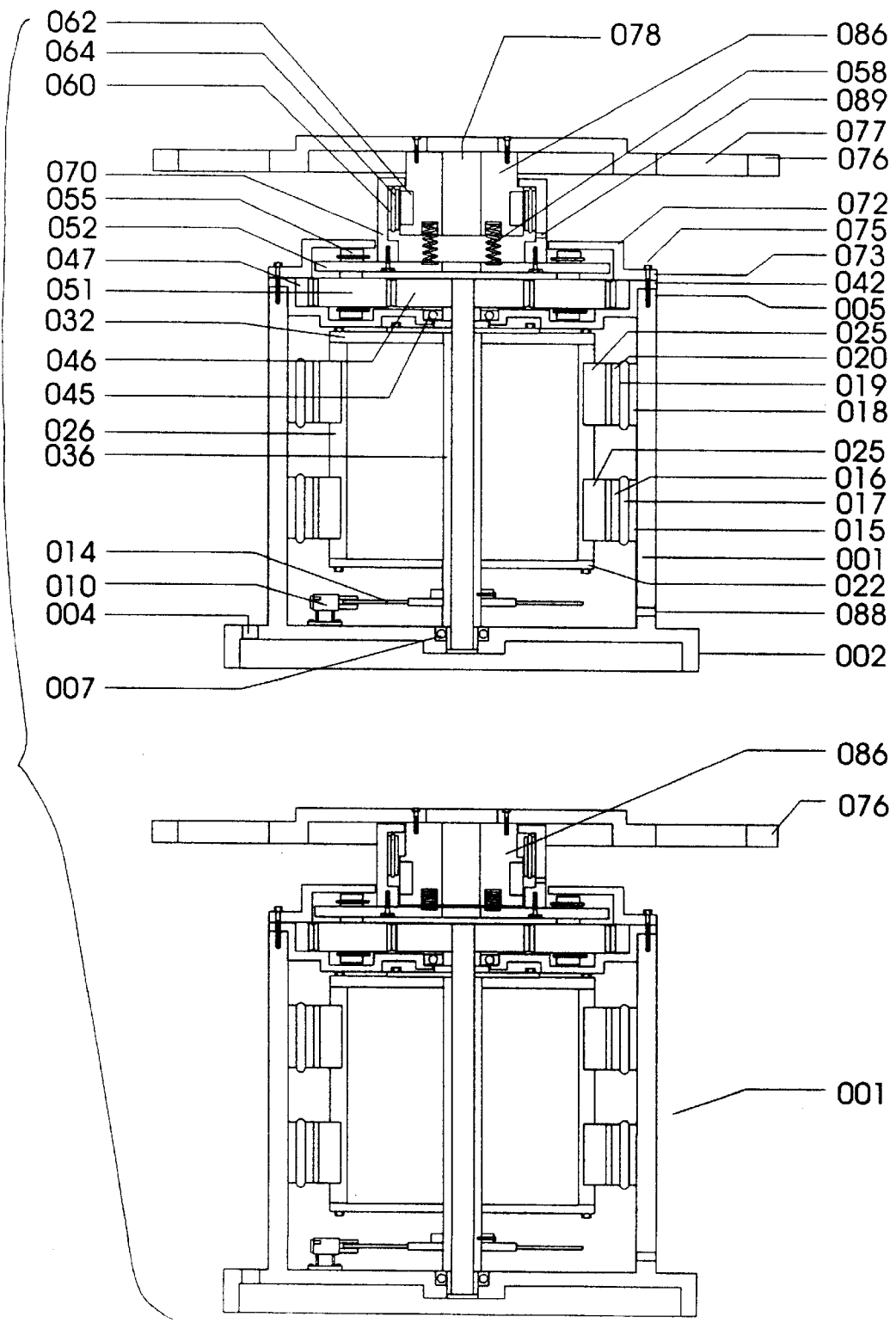
FIG. 24 is a cross-sectional view of the magnetism-sensitive lifter rotatable intermittently and dividing angles of the present invention.
Figure 25:
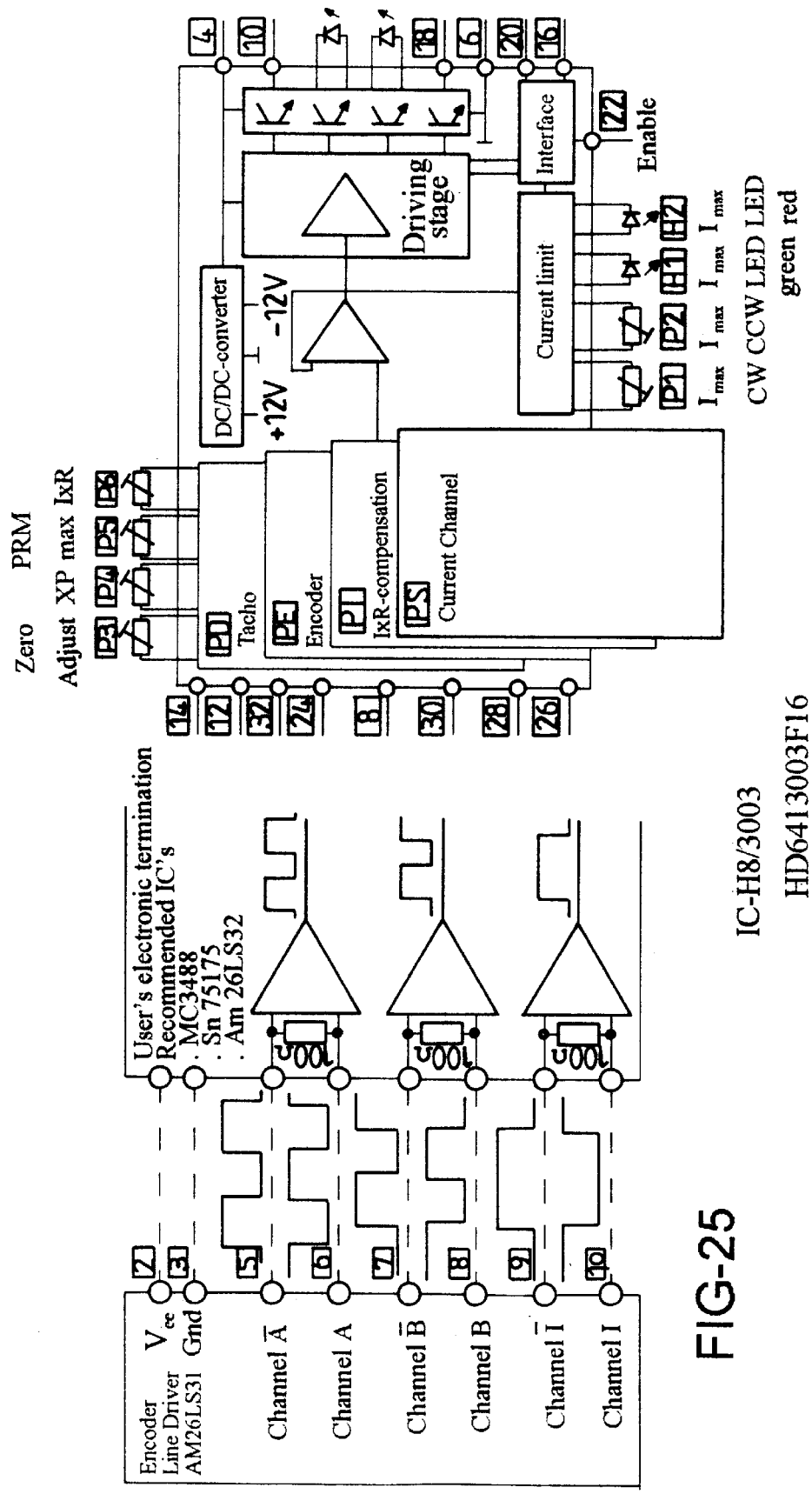
FIG. 25 is a graph of the wave signal received by the induction coils and driving the magnetism-sensitive lifter to rotate intermittently and divide angles equal or unequal.
Figure 25A:
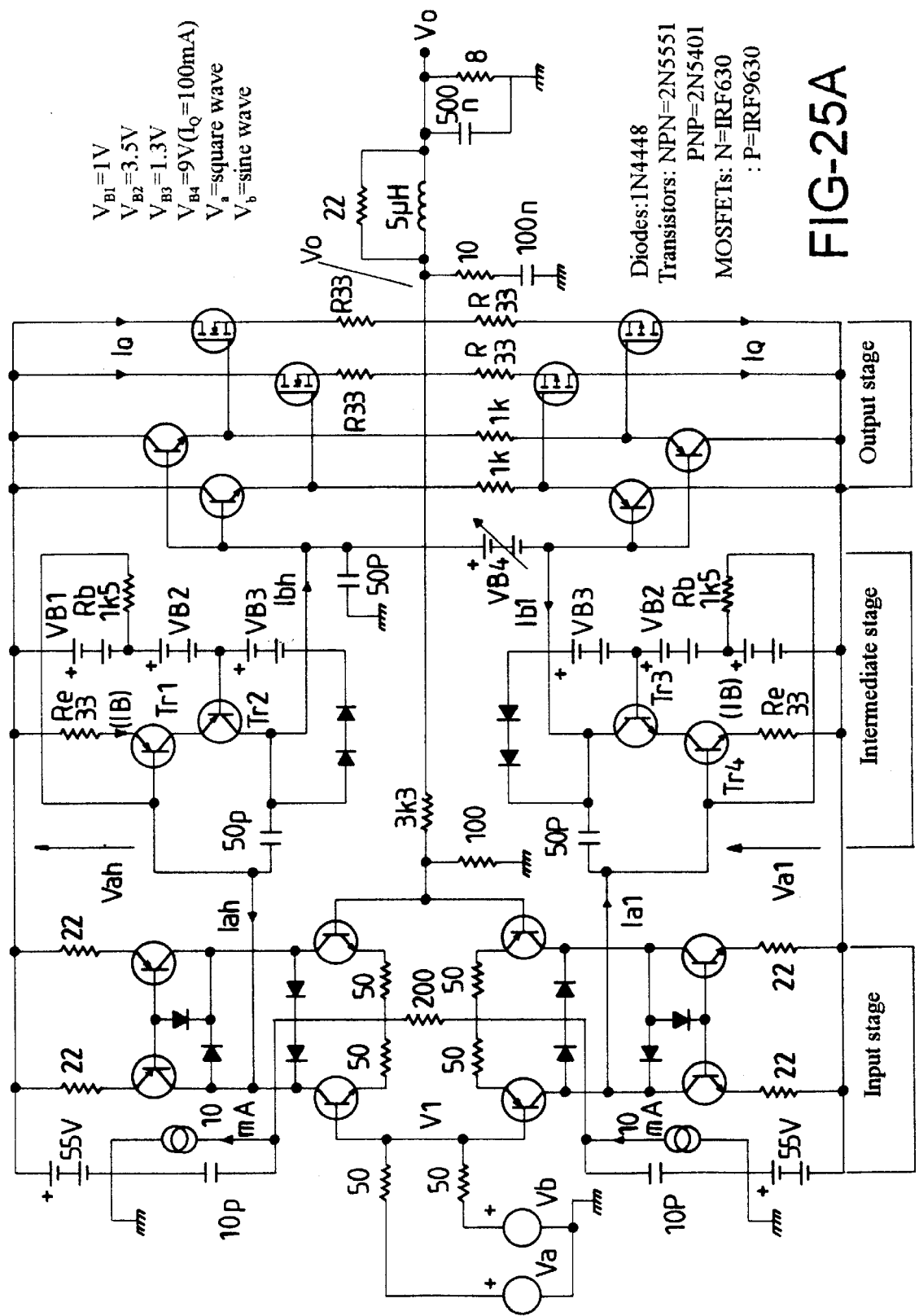
Figure 26:
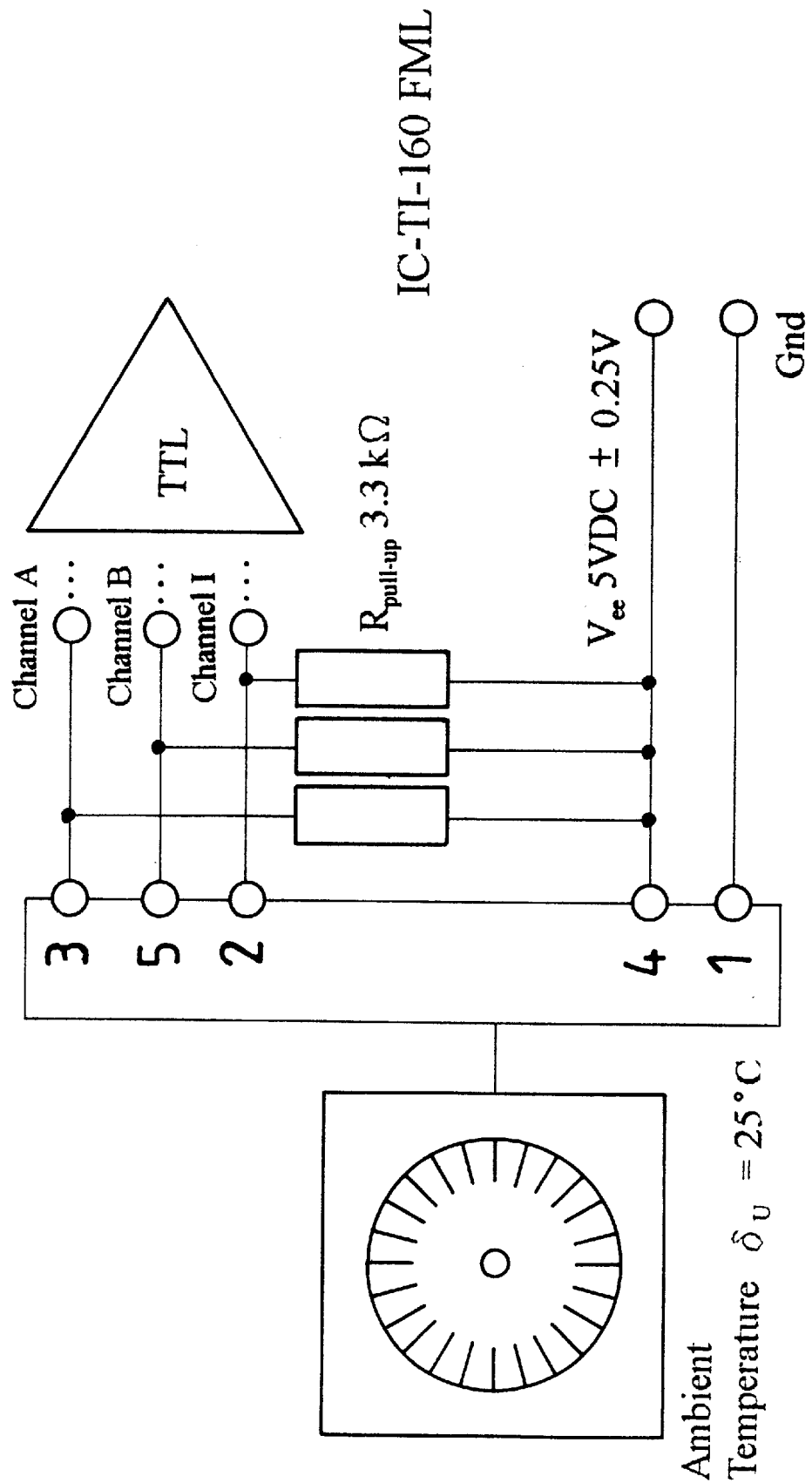
FIG. 26 is a chart of feedback signals coming from the dividing rotatable wheel.
Figure 26A:
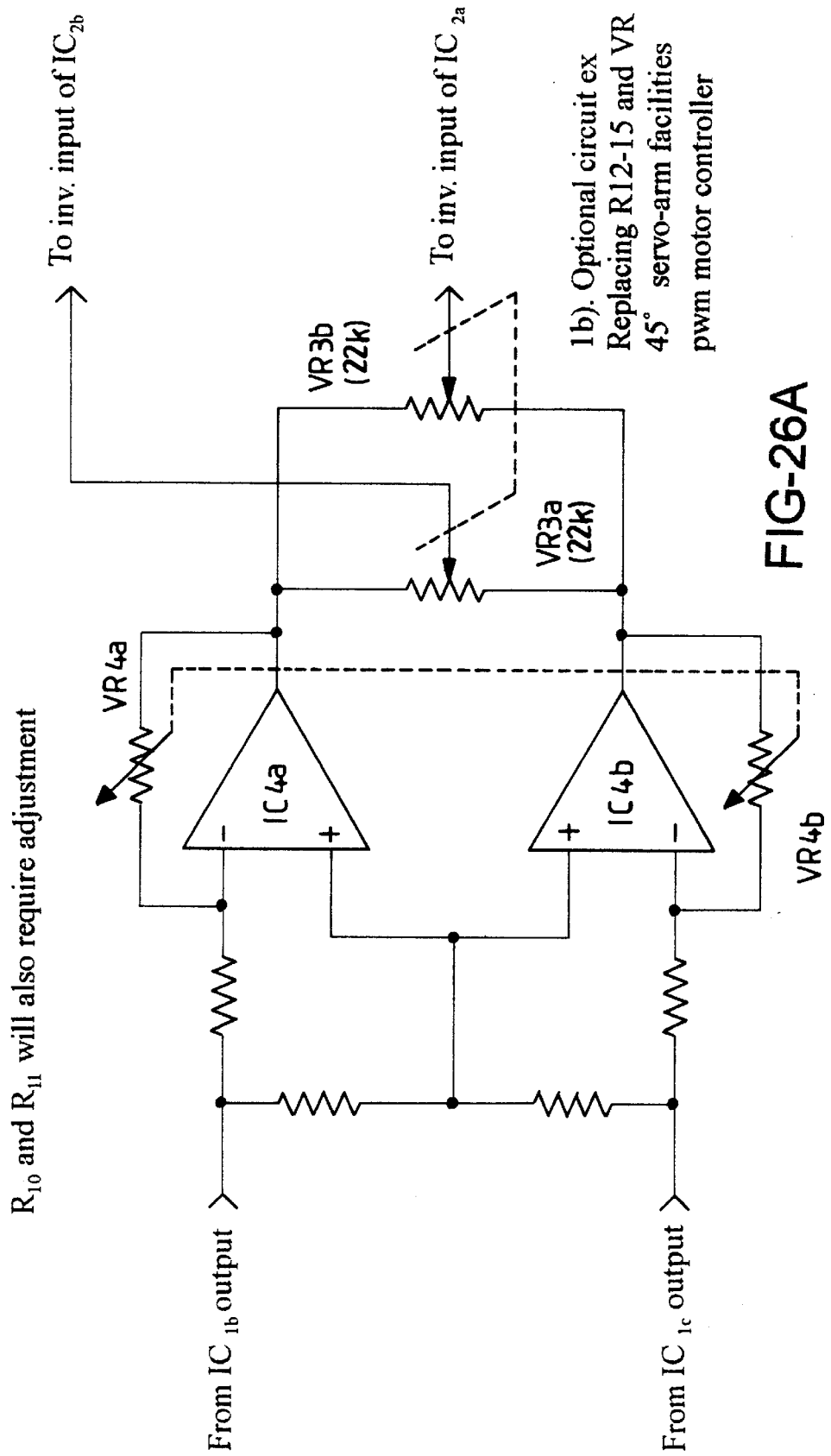
Figure 26B:
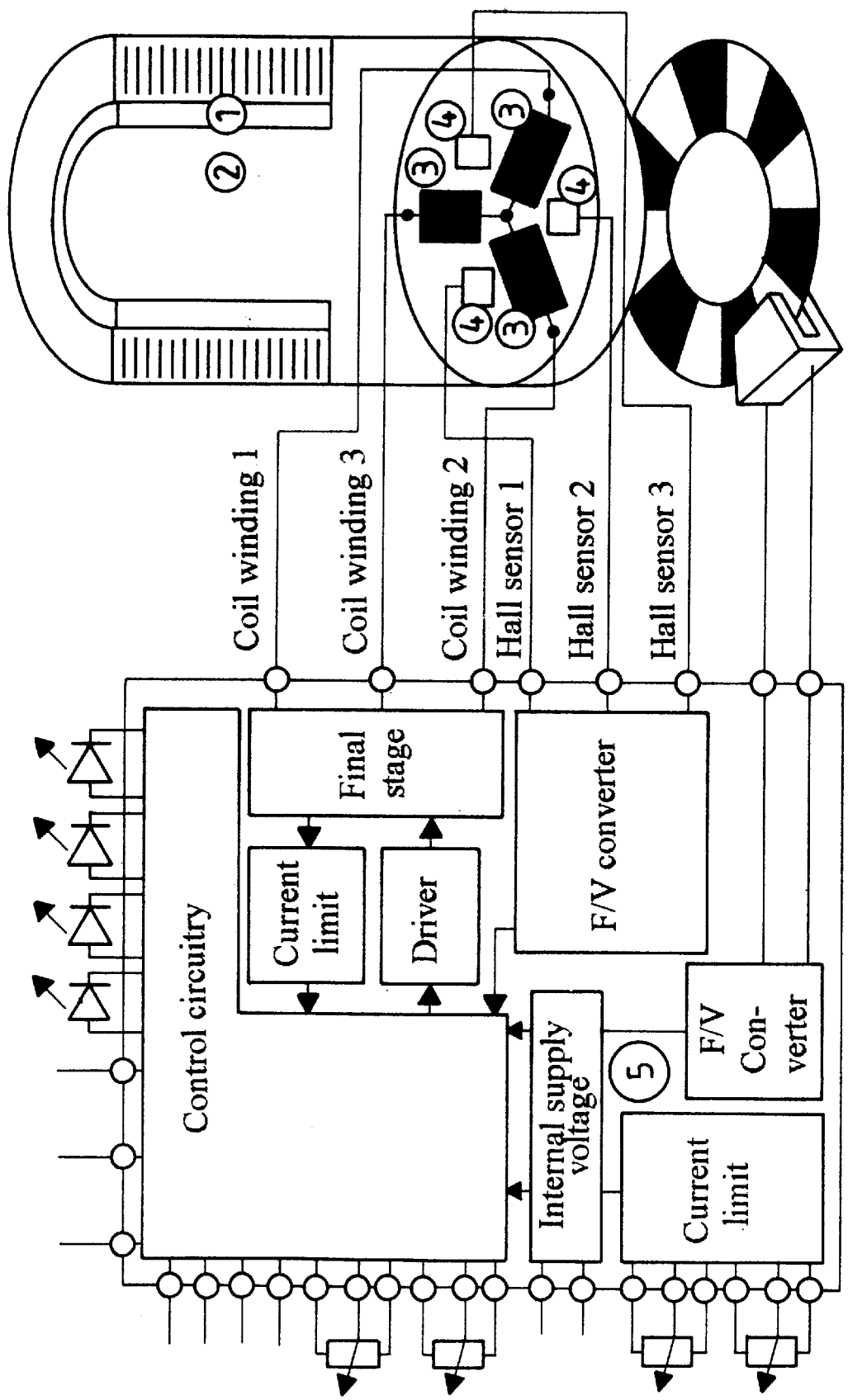
Figure 27:
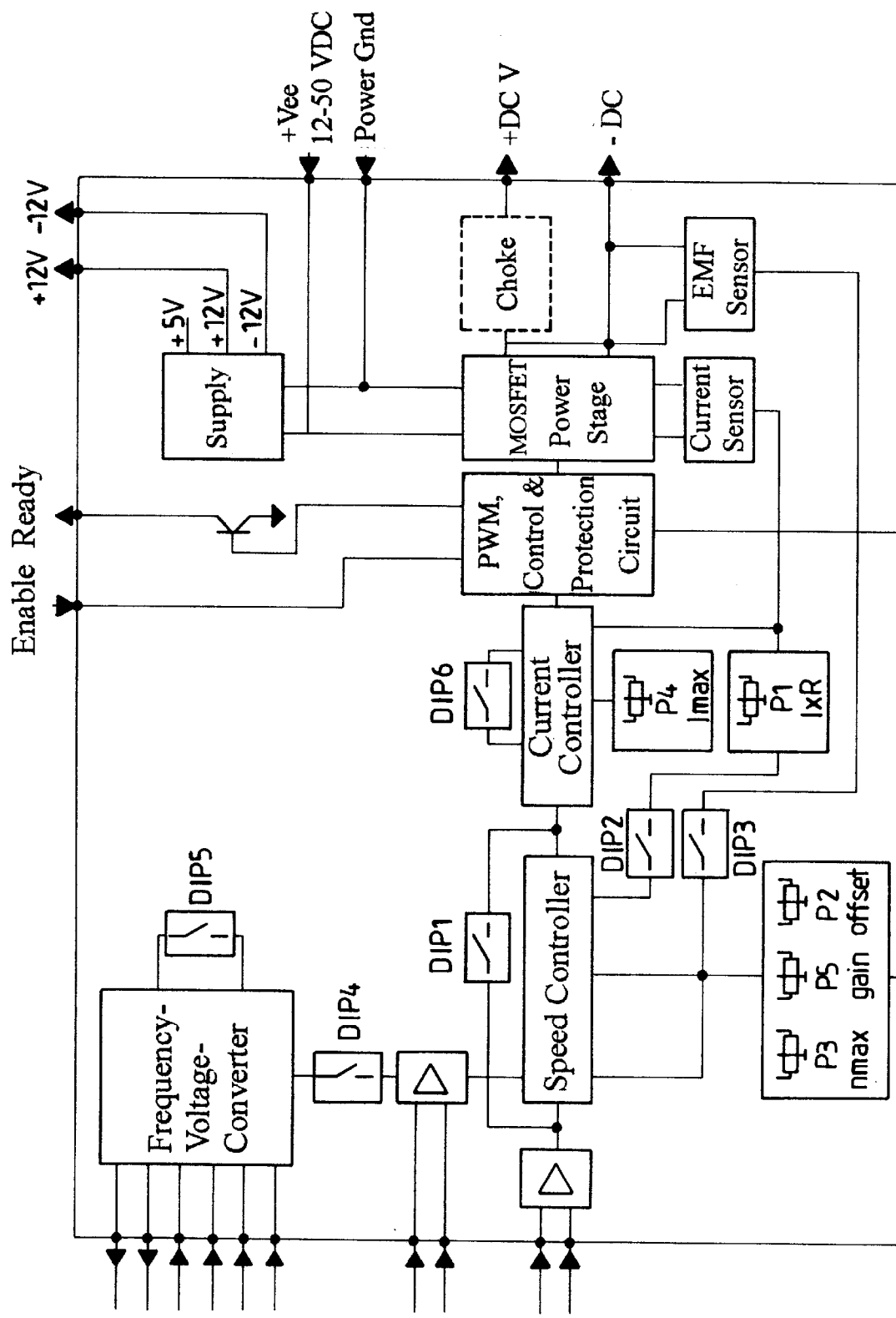
FIG. 27 is a chart of the control circuit for the clockwise and the counterclockwise rotation, for dividing angles equal and unequal and for moving up and down of the magnetism-sensitive lifter, controlled by the computer.
Figure 28A:
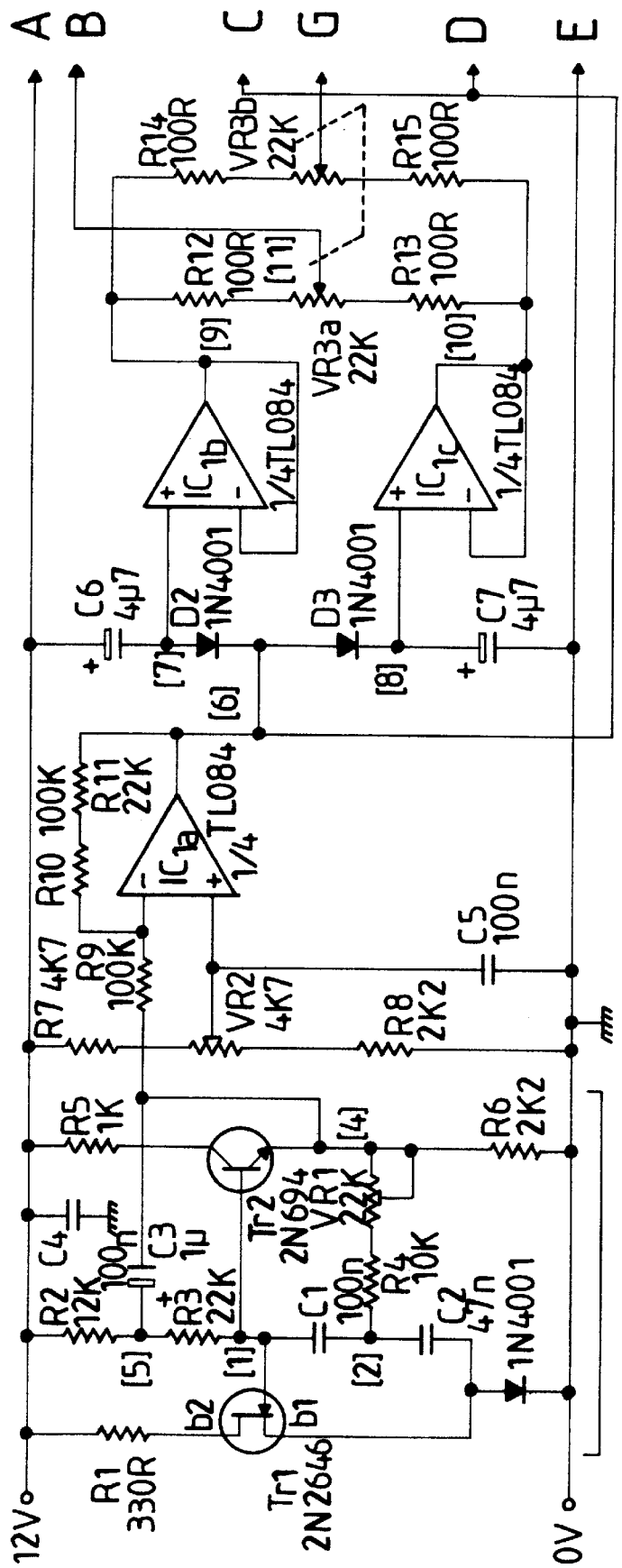
FIG. 28 is a chart of an electronic circuit for reducing inertia in rotation of the magnetism-sensitive lifter, controlled by the computer.
Figure 28B:
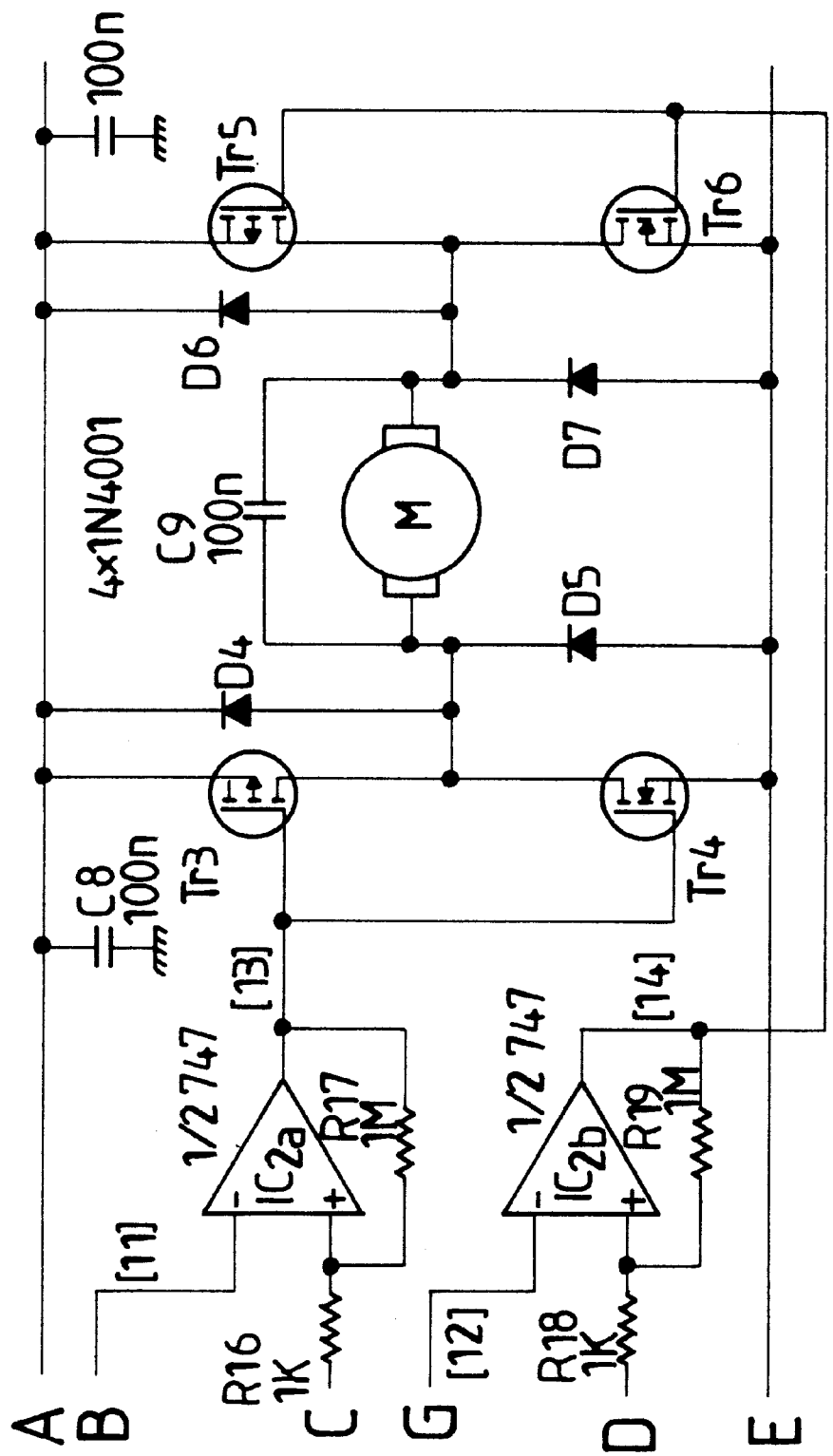

Next, as shown in FIG. 15, the center hollow cylinder 086 is a main element of the lifter, having an upper portion with three outer peripheral recesses divided equally by three projecting vertical guide rails 066, and plural rectangular recesses 067 formed in an outer surface of a lower portion for fitting permanent magnets 065 therein flush with the outer surface of the of the center hollow cylinder 086 to move up and down silently. Now FIG. 16 shows the lifter body 070, and plural annular multi-pole induction silicon steel magnets 060 fitted in an inner upper portion of the lifter body 070 and having plural poles fitted around with an induction coil 064. Then the induction silicon steel magnets 060 is moved up and down when the computer 092 sends a signal to them. FIG. 17 shows the center hollow cylinder 086 and the lifter body 070, and FIG. 18 shows the center hollow cylinder 086 moving up and down in the lifter body 070. FIG. 19 shows the center hollow cylinder 086, the lifter body 070 and the planet gear base 052 in an exploded condition. Under the center hollow cylinder 086 are three coil springs 058 to pull back down the cylinder 086, and the planet gear base 052 is secured with the lifter body 070 with bolts. FIG. 20 shows the planet gears 051, the planet gear base 052 and the shafts 055 of the planet gears 051 in an exploded condition and a combined condition. FIG. 21 shows the lifter body 070 with related components assembled together, and the upper cap 072 is fixed on the lifter body 070, finishing assemblage of the lifter in the invention. Referring to FIG. 22, the circular disc table 076 is fixed on the flat surface of the center hollow cylinder 086, completing an automatic assembling machine. FIG. 23 shows that the lifter can rotate clockwise or counterclockwise for equal or unequal angles and move up and down for different distances. FIG. 24 shows the cross-sectional view of the magnetism-sensitive lifter combined with the round worktable. The magnetism-sensitive lifter rotatable intermittently and dividing different angles by a computer 92 in the invention has advantages that it needs no motors for operation, reducing errors possibly caused by mechanical transmission, and the annular induction silicon magnet 015 has a plurality of induction pole surfaces 016 and each induction coil 017 wound around each pole 016 to be powered separately or in several groups by the computer 92, for directly dividing angles equal or unequal, rotating clockwise or counterclockwise, and movable up and down straight.

What is claimed is:

1. A magnetism-sensitive lifter rotatable intermittently and dividing angles controlled by a computer, comprising;

a housing of round shape containing other components;

a plurality of induction silicon steel magnets provided with a induction coil wound around each pole of said each induction silicon steel magnet; an angle dividing rotatable wheel provided coaxially with said each induction silicon steel magnet and having a hollow main shaft in a center;

a plurality of permanent magnet fitted in an outer surface of said angle dividing rotatable wheel corresponding to said induction silicon steel magnets; an angle dividing analysis sensing disc fixed on a lower end of said hollow main shaft, and a bearing fixed on an upper end of said hollow main shaft;

a planet gear base fixed on the upper end of said hollow main shaft;

an annular large gear having an inner annular continual teeth and placed in said planet gear base;

a sun gear fixed on the upper end of said hollow main shaft;

three planet gears respectively having a shaft and all engaging with said sun gear and said annular large gear at the same time;

a triangular planet gear output plate fixed on said three planet gears and having three holes for said planet gear shafts to protrude through up, said output plate rotating a magnetism-sensitive lifter body for equal angles or unequal angles; said magnetism sensitive lifter body shaped cylindrical and containing an annular multi-pole induction silicon steel magnet in an upper inner portion;

said annular multi-pole silicon steel magnet containing a center hollow cylinder in its center hollow, having a plurality poles on an inner peripheral surface equally spaced apart and respectively wound around with an induction coil;

said center hollow cylinder having a lower portion fitted with plural permanent magnets in recesses formed in an outer surface of said lower portion, said permanent magnets having an upper surface flush with said outer surface of said lower portion, an upper portion provided with three projecting guide vertical rails equidistantly spaced apart on an outer surface of said upper portion, said center hollow cylinder controlled by a computer to move up and down vertically;

an upper cap provided to close on said magnetism-sensitive lifter body; said computer having control programs to power said induction coils in said induction silicon steel magnets to attract or repel said permanent magnets in said angle dividing rotatable wheel so that said magnetism-sensitive lifter may rotate intermittently, divide angles equal or unequal and move up and down; and, a round work table fixed said magnetism-sensitive lifter rotatable intermittently and dividing angles by the computer, permitting an automotive machine perform intermittent rotation, angle dividing and intermittent vertical movement.

2. The magnetism-sensitive lifter rotatable intermittently and dividing angles with a computer as claimed in claim 1, wherein said induction coils in said annular silicon steel magnets corresponding to said permanent magnets of said angle dividing rotatable wheel are powered by said computer separately or in groups, and therefore said permanent magnets and said induction coils may attract and repel one another, permitting said magnetism-sensitive lifter rotate intermittently and clockwise and counterclockwise and divide angles equal or unequal.

3. The magnetism-sensitive lifter rotatable intermittently and dividing angles with a computer as claimed in claim 1, wherein said angle dividing rotatable wheel is combined with said hollow main shaft in the center for convenience of wiring, and said angle divide analysis sense disc is fixed with the lower end said hollow main shaft and said sensor to receive feedback from the computer to exact the angle divided.

4. The magnetism-sensitive lifter rotatable intermittently and dividing angles with a computer as claimed in claim 1, wherein said housing and said hollow main shaft are coaxial, and said planet gear base is located in an upper interior of said housing for said annular large gear, said sun gear and said three planet gears to be deposited thereon, and then said triangular planet gear output base plate fitted on said sun gear and said three planet gears to enforce rotation caused by said permanent magnets and said induction coils powered.

5. The magnetism-sensitive filter rotatable intermittently and dividing angles with a computer as claimed in claim 1, wherein said triangular planet gear output base plate deposited in the upper end of said housing rotates said magnetism-sensitive lifter body to rotate for various angles, and said annular induction silicon steel magnets placed on said magnetism-sensitive lifter body, and said round hollow cylinder is placed in said induction silicon steel magnets, with many permanent magnets fitted spaced apart in an outer surface of a lower portion of said round hollow cylinder, and when said computer transmits sine wave current to said induction coils, said magnetism-sensitive lifter may move up and down vertically.

6. The magnetism-sensitive filter rotatable intermittently and dividing angles with a computer as claimed in claim 1, wherein said upper cap is fixed on said magnetism-sensitive lifter body, integrating said same lifter body with said housing to form said complete magnetism-sensitive filter rotatable intermittently and dividing angles with a computer.

* * * * *